US011606130B2

(12) United States Patent
Cha et al.

(10) Patent No.: US 11,606,130 B2
(45) Date of Patent: Mar. 14, 2023

(54) POSITIONING METHOD IN WIRELESS COMMUNICATION SYSTEM, AND DEVICE SUPPORTING SAME

(71) Applicant: LG ELECTRONICS INC., Seoul (KR)

(72) Inventors: Hyunsu Cha, Seoul (KR); Sukhyon Yoon, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/431,050

(22) PCT Filed: Feb. 14, 2020

(86) PCT No.: PCT/KR2020/002106
§ 371 (c)(1),
(2) Date: Aug. 13, 2021

(87) PCT Pub. No.: WO2020/167023
PCT Pub. Date: Aug. 20, 2020

(65) Prior Publication Data
US 2022/0140880 A1    May 5, 2022

(30) Foreign Application Priority Data
Feb. 14, 2019 (KR) ........................ 10-2019-0016986

(51) Int. Cl.
*H04B 7/06* (2006.01)
*H04B 7/08* (2006.01)
(Continued)

(52) U.S. Cl.
CPC ......... *H04B 7/0639* (2013.01); *H04B 7/0617* (2013.01); *H04B 7/088* (2013.01);
(Continued)

(58) Field of Classification Search
CPC .. H04B 7/0639; H04B 17/327; H04B 7/0617; H04B 7/088; H04W 72/042; H04W 72/046
See application file for complete search history.

(56) References Cited

U.S. PATENT DOCUMENTS 10,420,063 B2 *   9/2019  Ly ............................. G01S 5/00
2020/0351815 A1 * 11/2020  Kim ...................... H04W 56/00
(Continued)

FOREIGN PATENT DOCUMENTS

| KR | 1020170061009 A | 6/2017 |
| WO | 2016164085 A1 | 10/2016 |
| WO | 2017164925 A1 | 9/2017 |

OTHER PUBLICATIONS

International Search Report from PCT/KR2020/002106, dated Jun. 8, 2020.
(Continued)

*Primary Examiner* — Jaison Joseph
(74) *Attorney, Agent, or Firm* — Dentons US LLP

(57) ABSTRACT

Various embodiments of the present disclosure provide a method for transmitting or receiving a signal in a wireless communication system, and a device supporting same. For a more specific example, disclosed are a method and a device supporting same, the method comprising: receiving one or more downlink reference signal (DL RS) resources on the basis of one or more reception beams; determining a reception beam satisfying a specific condition from among the one or more reception beams; transmitting information on an index of a DL RS resource received via the determined reception beam; and transmitting an uplink reference signal (UL RS) in a direction corresponding to the index of the DL RS resource.

12 Claims, 34 Drawing Sheets

(51) Int. Cl.
- *H04B 17/327* (2015.01)
- *H04W 72/04* (2023.01)
- *H04W 72/044* (2023.01)

(52) U.S. Cl.
CPC ........ *H04B 17/327* (2015.01); *H04W 72/042* (2013.01); *H04W 72/046* (2013.01)

(56) References Cited

U.S. PATENT DOCUMENTS

| | | | | |
|---|---|---|---|---|
| 2021/0204323 | A1* | 7/2021 | Xu | H04W 74/0833 |
| 2021/0293917 | A1* | 9/2021 | Yuan | H04B 7/0639 |
| 2021/0356581 | A1* | 11/2021 | Keating | G01S 13/878 |
| 2021/0377892 | A1* | 12/2021 | Chen | H04B 1/715 |
| 2021/0409967 | A1* | 12/2021 | Franke | H04W 72/042 |
| 2022/0011396 | A1* | 1/2022 | Keating | G01S 5/0257 |

OTHER PUBLICATIONS

Written Opinion of the ISA from PCT/KR2020/002106, dated Jun. 8, 2020.

Fraunhofer IIS, Fraunhofer HHI, "NR beam management supporting multi-gNB measurements for positioning", 3GPP TSG RAN WG1 Meeting #95, Nov. 12-16, 2018, R1-1813583.

LG Electronics, "Discussions on DL only based Positioning", 3GPP TSG RAN WG1 Ad-Hoc Meeting 1901, Jan. 21-25, 2019, R1-1900629.

\* cited by examiner (a)

(b)

POSITIONING METHOD IN WIRELESS COMMUNICATION SYSTEM, AND DEVICE SUPPORTING SAME

This application is the National Stage filing under 35 U.S.C. 371 of International Application No. PCT/KR2020/002106 filed on Feb. 14, 2020, which claims priority to Korean Patent Application No. 10-2019-0016986 filed on Feb. 14, 2019, the contents of which are all hereby incorporated by reference herein in their entirety.

TECHNICAL FIELD

Various embodiments of the present disclosure relate to a wireless communication system, and more particularly, to a positioning method in a wireless communication system and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

The present disclosure may provide a method and apparatus for transmitting and receiving a signal in a wireless communication system.

Specifically, various embodiments of the present disclosure may provide a positioning method in a wireless communication system and an apparatus supporting the same.

It will be appreciated by persons skilled in the art that the objects that could be achieved with various embodiments of the present disclosure are not limited to what has been particularly described hereinabove and the above and other objects that various embodiments of the present disclosure could achieve will be more clearly understood from the following detailed description.

Technical Solution

Various embodiments of the present disclosure may provide a method and apparatus for transmitting and receiving signals in a wireless communication system.

According to an aspect of the present disclosure, a method of a user equipment (UE) in a wireless communication system includes receiving at least one downlink (DL) reference signal (RS) resource based on at least one reception beam, determining a reception beam satisfying a specific condition from among the at least one reception beam, transmitting information about an index of a DL RS resource received through the determined reception beam, and transmitting an uplink (UL) RS in a direction corresponding to the index of the DL RS resource.

According to another aspect of the present disclosure, a UE in a wireless communication system includes a receiver, a transmitter, and a processor. The receiver is configured to receive at least one DL RS resource based on at least one reception beam and determine a reception beam satisfying a specific condition from among the at least one reception beam, and the transmitter is configured to transmit information about an index of a DL RS resource received through the determined reception beam, and transmit an uplink (UL) RS in a direction corresponding to the index of the DL RS resource.

According to another aspect of the present disclosure, an apparatus for a UE includes at least one processor, and at least one computer memory operatively coupled to the at least one processor and storing instructions which when executed, cause the at least one processor to perform operations. The operations include receiving at least one DL RS resource based on at least one reception beam, determining a reception beam satisfying a specific condition from among the at least one reception beam, transmitting information about an index of a DL RS resource received through the determined reception beam, and transmitting a UL RS in a direction corresponding to the index of the DL RS resource.

According to another aspect of the present disclosure, a computer-readable storage medium stores at least one computer program including instructions which when executed by at least one processor, cause the at least one processor to perform operations for a UE. The operations include receiving at least one DL RS resource based on at least one reception beam, determining a reception beam satisfying a specific condition from among the at least one reception beam, transmitting information about an index of a DL RS resource received through the determined reception beam, and transmitting a UL RS in a direction corresponding to the index of the DL RS resource.

The specific condition may be to have a minimum of propagation time (PT), time of arrival (ToA), or time of flight (ToF) measurements of the at least one DL RS.

The information about the index of the DL RS resource may be used for positioning the UE.

Further, location information about a base station (BS) or a transmission point (TP) may be received, information about a cell-identifier (cell-ID) of a cell in which the BS or the TP is located may be received, and a reception beam direction range may be limited based on the location information and the cell-ID.

The DL RS may be a positioning reference signal (PRS), a channel state information reference signal (CSI-RS), or a synchronization signal block (SSB).

The UL RS may be a sounding reference signal (SRS).

The specific condition may be to have a maximum of reference signal received power (RSRP) measurements of the at least one DL RS.

Various embodiments of the present disclosure as described above are only some of preferred embodiments of the present disclosure, and those skilled in the art may derive and understand many embodiments in which technical features of the various embodiments of the present disclosure are reflected based on the following detailed description.

Advantageous Effects

According to various embodiments of the present disclosure, the following effects are achieved.

According to various embodiments of the present disclosure, a method and apparatus for positioning a user equipment (UE) in a wireless communication system may be provided.

Specifically, a method and apparatus for determining or configuring a transmission/reception beam to effectively perform a hybrid UE positioning scheme and/or a joint UE positioning scheme, which uses both downlink-based UE positioning and uplink-based UE positioning may be provided.

It will be appreciated by persons skilled in the art that the effects that can be achieved with various embodiments of the present disclosure are not limited to what has been particularly described hereinabove and other advantages of various embodiments of the present disclosure will be more clearly understood from the following detailed description.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
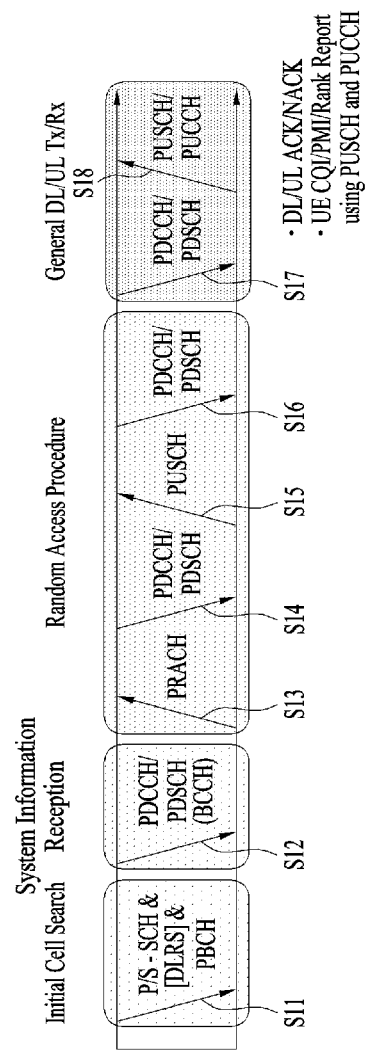
FIG. 1 is a diagram illustrating physical channels used in various embodiments of various embodiments of the present disclosure and a signal transmission method using the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and 3GPP TS 38.455. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The 3GPP NR system as well as the 3GPP LTE/LTE-A system will be described as a wireless access system to which various embodiments of the present disclosure are applicable.

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system.

CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA).

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a radio access system, a UE receives information from a BS on DL and transmits information to the BS on UL. Information transmitted and received by the BS and the UE includes general data information and various control information, and various physical channels exist according to the type/usage of the information transmitted and received by the BS and the UE.

FIG. 1 is a diagram illustrating physical channels used in various embodiments of the present disclosure and a signal transmission method using the same.

When a UE is powered on again from a power-off state or enters a new cell, the UE performs an initial cell search procedure, such as acquisition of synchronization to a BS (S11). To this end, the UE establishes synchronization with the BS by receiving a primary synchronization channel (P-SCH) and a secondary synchronization channel (S-SCH) from the BS and acquires information such as a cell identity (ID).

Then the UE may acquire information broadcast in a cell by receiving a PBCH signal from the BS.

In the initial cell search procedure, the UE may monitor a DL channel status by receiving a DL RS.

Upon completion of the initial cell search procedure, the UE may acquire more detailed system information by receiving a PDCCH and a PDSCH according to information carried on the PDCCH (S12).

Next, the UE may perform a random access procedure in order to complete access to the BS (S13 to S16). To this end, the UE may transmit a preamble through a PRACH (S13) and receive a random access response (RAR) to the preamble through the PDCCH and the PDSCH corresponding to the PDCCH (S14). The UE may transmit a PUSCH using scheduling information in the RAR (S15) and perform a contention resolution procedure such as reception of a PDCCH signal and reception of a PDSCH signal corresponding to the PDCCH signal (S16).

Meanwhile, the random access procedure is performed in two steps, S13 and S15 may be performed as one operation in which the UE performs transmission, and S14 and S16 may be performed as one operation in which the BS performs transmission.

The UE that has performed the above-described procedure may receive a PDCCH signal and/or a PDSCH signal (S17) and/or transmit a PUSCH signal and/or a PUCCH signal (S18), as a general UL/DL signal transmission procedure.

Control information that the UE transmits to the BS is collectively referred to as UCI. The UCI includes HARQ-ACK/NACK, scheduling request (SR), CQI, PMI, and RI information.

Generally, the UCI is periodically transmitted through the PUCCH. However, when control information and data should be simultaneously transmitted, the UCI may be transmitted through the PUSCH. In addition, the UE may aperiodically transmit the UCI through the PUSCH according to the request/indication of a network.

1.2. Radio Frame Structure

Figure 2:
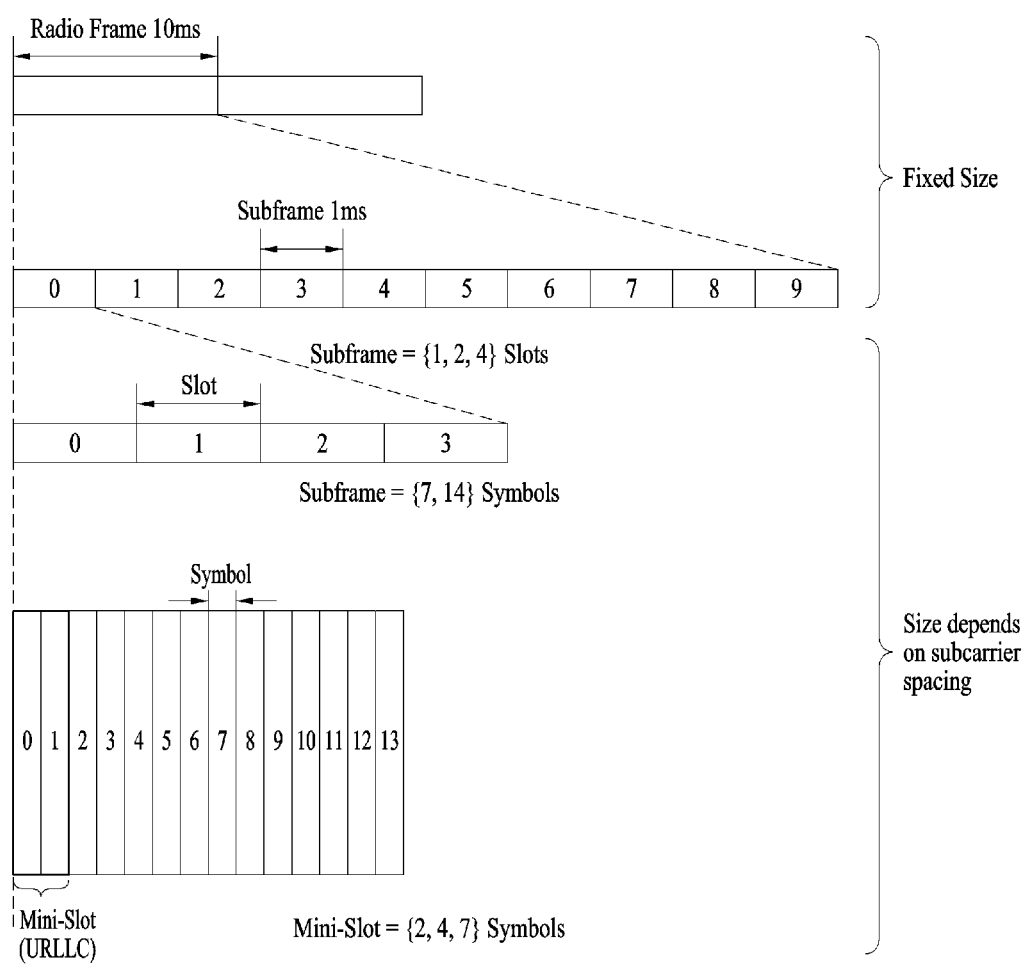
FIG. 2 is a diagram illustrating a radio frame structure in a new radio access technology (NR) system, to which various embodiments of the present disclosure are applicable.

FIG. 2 is a diagram illustrating a radio frame structure in an NR system, to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, µ and a CP are obtained from RRC parameters provided by the BS.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology µ, slots are numbered with $n^\mu_s \in \{0, \ldots, N^{slot,\mu}_{subframe}-1\}$ in an increasing order in a subframe, and with $n_{s,f}^- \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Figure 3:
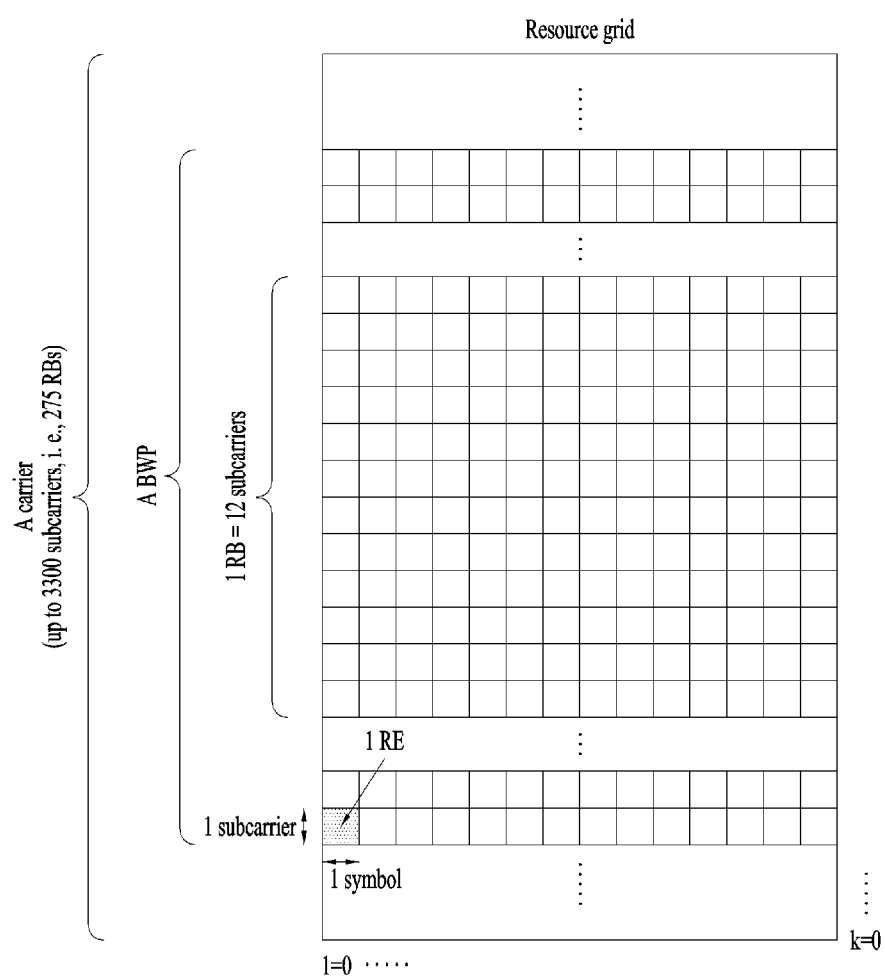
FIG. 3 is a diagram illustrating a slot structure in the NR system, to which various embodiments of the present disclosure are applicable.

FIG. 3 is a diagram illustrating a slot structure in the NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
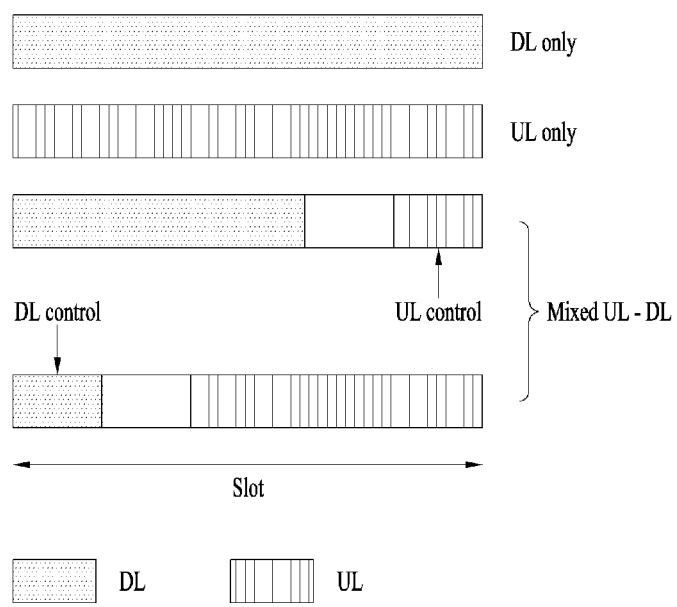
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

Referring to FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 4.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:
  sameAsREG-bundle: It equals to an REG bundle size in the frequency domain.
  allContiguousRBs: It equals to the number of contiguous RBs in the frequency domain within the CORESET.

The REGs of the CORESET are numbered in a time-first mapping manner That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell Search

Figure 5:
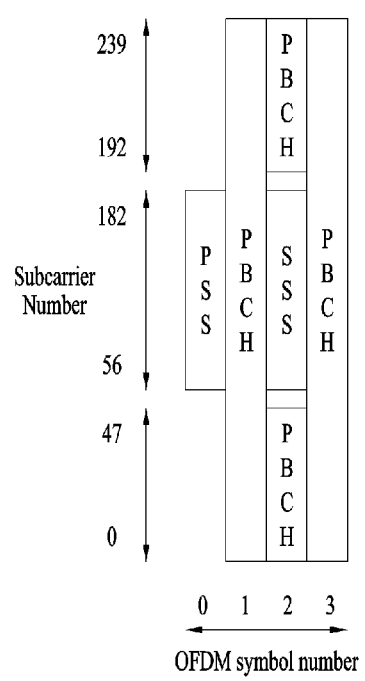
FIG. 5 is a diagram illustrating the structure of a synchronization signal block (SSB) to which various embodiments of the present disclosure are applicable.

FIG. 5 illustrates a synchronization signal block (SSB) structure to which various embodiments of the present disclosure are applicable.

The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 5, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 8 below.

TABLE 8

| Type of Signals | | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There are 336 cell ID groups each including three cell IDs. Therefore, there are 1008 cell IDs in total. Information about a cell ID group to which the cell ID of a cell belongs may be provided/obtained by the SSS of the cell, and information about the cell ID among 336 cells within the cell ID may be provided/obtained by the PSS.

Figure 6:
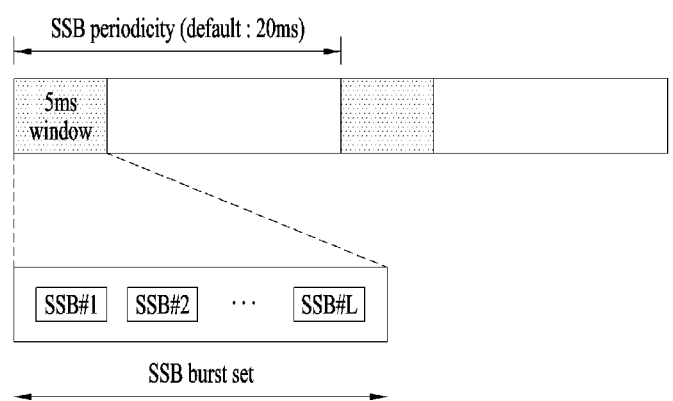
FIG. 6 is a diagram illustrating an exemplary SSB transmission method to which various embodiments of the present disclosure are applicable.

FIG. 6 is a diagram illustrating an exemplary SSB transmission method to which various embodiments of the present disclosure are applicable.

Referring to FIG. 6, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A: 15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

2. Positioning

Positioning may be determining the geographic location and/or speed of a UE by measuring a radio signal. Location information may be requested by a client (e.g., an application) related to the UE and reported to the client. Further, the location information may be included in a core network or requested by a client connected to the core network. The location information may be reported in a standard format such as cell-based or geographic coordinates. In this case, an estimation error value for the location and speed of the UE and/or a positioning method used for positioning may also be reported together.

For the positioning, a positioning reference signal (PRS) may be used. The PRS is an RS used for UE positioning.

2.1. PRS in LTE System

For example, in the LTE system, the PRS may be transmitted only in a DL subframe configured for PRS transmission (hereinafter, referred to as 'positioning subframe'). When both a multimedia broadcast single frequency network (MBSFN) subframe and a non-MBSFN subframe are configured as positioning subframes, the OFDM symbols of the MBSFN subframe should have the same CP as subframe #0. When positioning subframes in a cell are configured to be only MBSFM subframes, OFDM symbols configured for the PRS in the MBSFN subframe may have extended CPs.

The sequence of the PRS may be defined by Equation 1 below.

$$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, 2N_{RB}^{max,DL}-1$$

[Equation 1]

where ns denotes a slot number in a radio frame and l denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by Equation 2 below.

$$c_{init}=2^{28}\cdot\lfloor N_{ID}^{PRS}/512\rfloor+2^{10}\cdot(7\cdot(n_s+1)+l+1)\cdot(2\cdot(N_{ID}^{PRS} \bmod 512)+1)+2\cdot(N_{ID}^{PRS} \bmod 512)+N_{CP}$$

[Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 7:
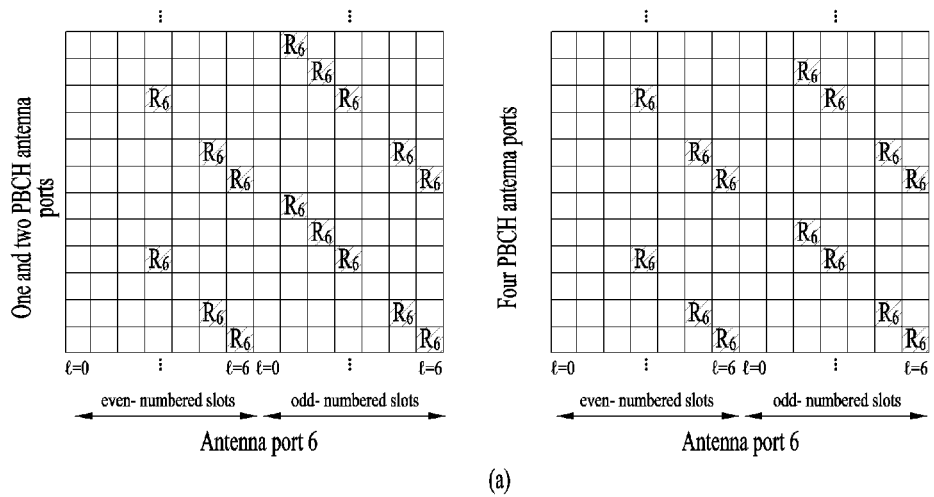
FIG. 7 is a diagram illustrating examples of positioning reference signal (PRS) mapping in a long term evolution (LTE) system, to which various embodiments of the present disclosure are applicable.
Figure 7:
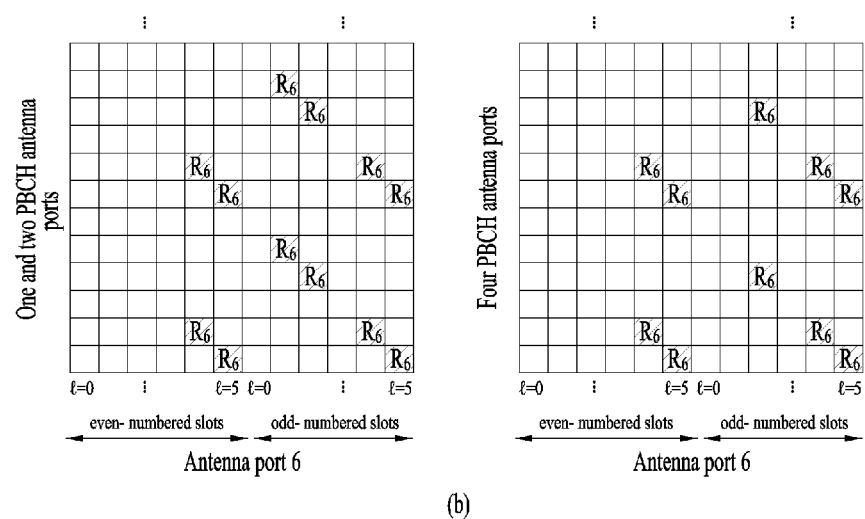

FIG. 7 illustrates an exemplary pattern to which a PRS is mapped in a subframe.

As illustrated in FIG. 7, the PRS may be transmitted through an antenna port 7. FIG. 7(a) illustrates mapping of the PRS in the normal CP and FIG. 7(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 9 below.

TABLE 9

| PRS configuration Index ($I_{PRS}$) | PRS periodicity (subframes) | PRS subframe offset (subframes) |
|---|---|---|
| 0–159 | 160 | $I_{PRS}$ |
| 160–479 | 320 | $I_{PRS}$ − 160 |
| 480–1119 | 640 | $I_{PRS}$ − 480 |
| 1120–2399 | 1280 | $I_{PRS}$ − 1120 |
| 2400–2404 | 5 | $I_{PRS}$ − 2400 |
| 2405–2414 | 10 | $I_{PRS}$ − 2405 |
| 2415–2434 | 20 | $I_{PRS}$ − 2415 |
| 2435–2474 | 40 | $I_{PRS}$ − 2435 |
| 2475–2554 | 80 | $I_{PRS}$ − 2475 |
| 2555–4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.2. UE Positioning Architecture in NR System

Figure 8:
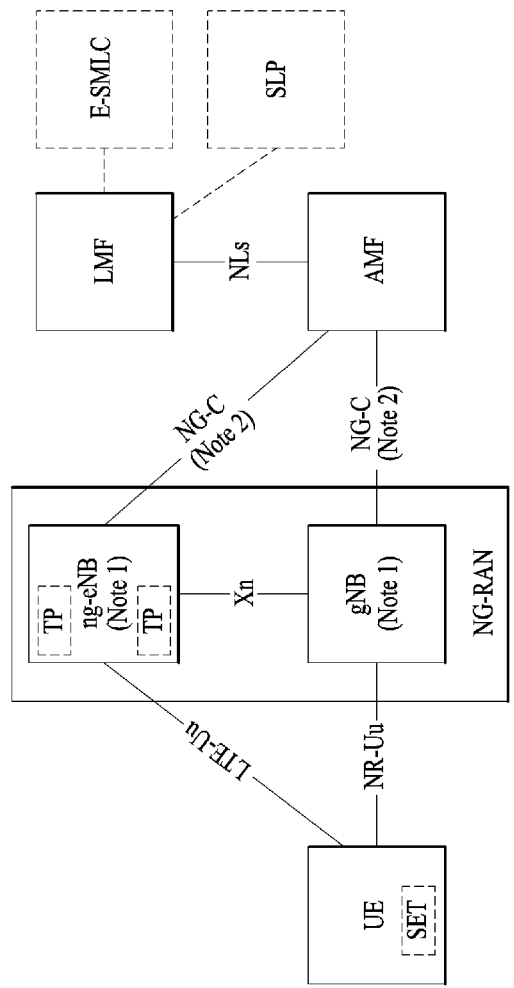
FIG. 8 is a block diagram illustrating an exemplary system architecture for positioning a user equipment (UE), to which to which various embodiments of the present disclosure are applicable.

FIG. 8 is a diagram illustrating an exemplary system architecture for UE positioning, to which various embodiments of the present disclosure are applicable.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.3. Operation for UE Positioning

Figure 9:
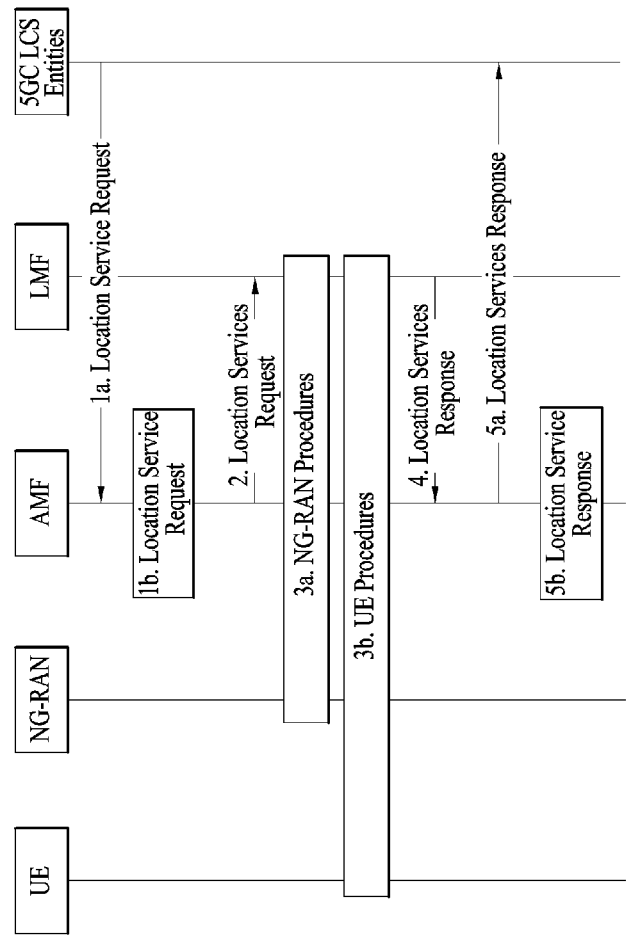
FIG. 9 is a diagram illustrating a signal flow for an exemplary UE positioning process to which various embodiments of the present disclosure are applicable.

FIG. 9 is a diagram illustrating an exemplary UE positioning procedure to which various embodiments of the present disclosure are applicable.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

2.4. Protocol for Location Measurement 2.4.1. LTE Positioning Protocol (LPP)

Figure 10:
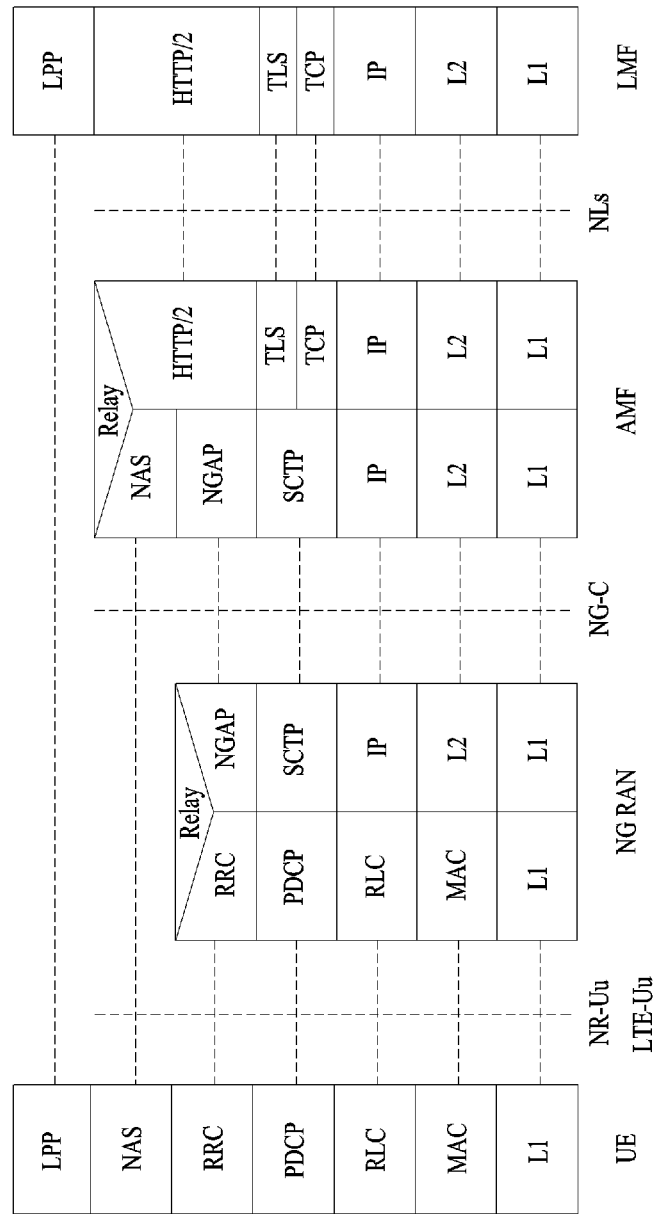
FIG. 10 is a diagram illustrating exemplary protocol layers for supporting transmission of an LTE positioning protocol (LPP) message, to which various embodiments of the present disclosure are applicable.

FIG. 10 is a diagram illustrating exemplary protocol layers for supporting transmission of an LTE positioning protocol (LPP) message, to which various embodiments of the present disclosure are applicable. An LPP protocol data unit (PDU) may be transmitted in a NAS PDU between an MAF and a UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.4.2. NR Positioning Protocol A (NRPPa)

Figure 11:
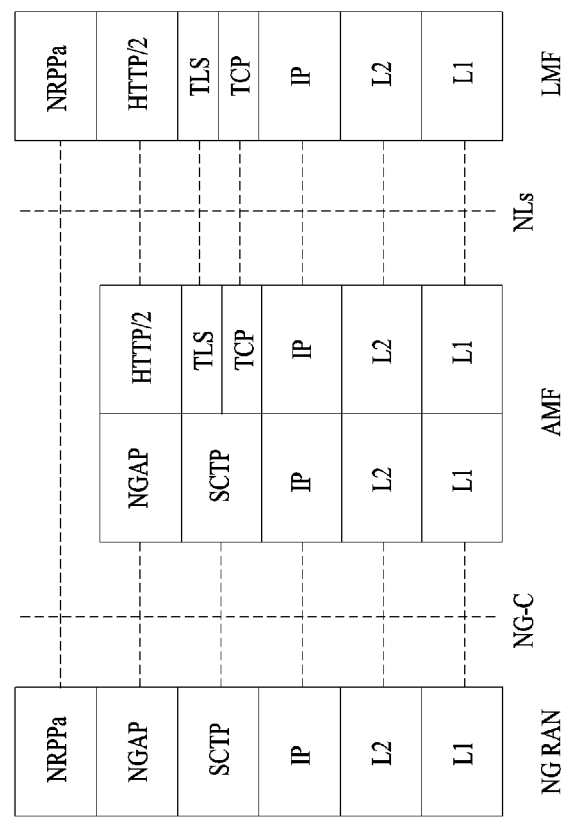
FIG. 11 is a diagram illustrating exemplary protocol layers for supporting transmission of an NR positioning protocol a (NRPPa) protocol data unit (PDU), to which various embodiments of the present disclosure are applicable.

FIG. 11 is a diagram illustrating exemplary protocol layers for supporting transmission of an NR positioning protocol a (NRPPa) PDU, to which various embodiments of the present disclosure are applicable;

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.5. (Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc.

Although any one of the positioning methods may be used for UE positioning, two or more positioning methods may be used for UE positioning.

2.5.1. OTDOA (Observed Time Difference of Arrival)

Figure 12:
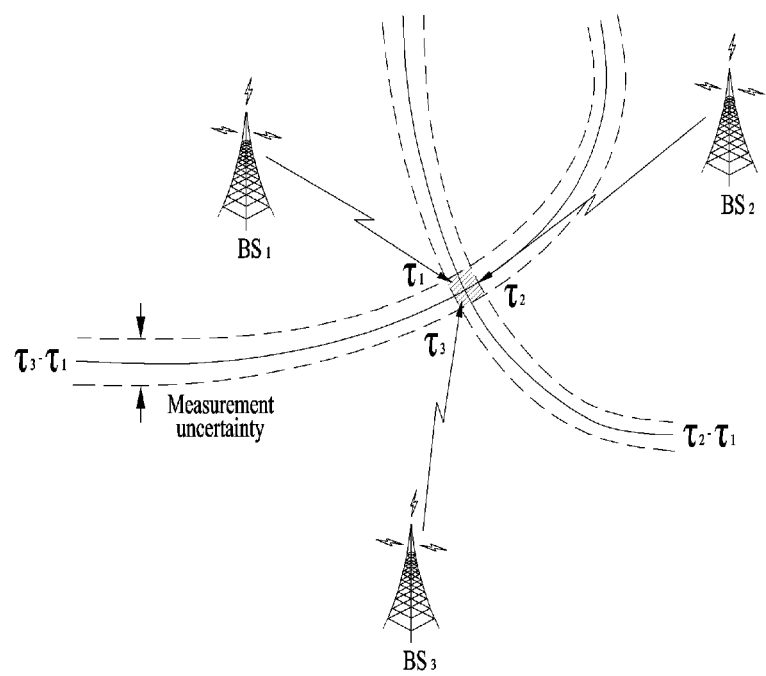
FIG. 12 is a diagram illustrating an exemplary observed time difference of arrival (OTDOA) positioning method to which various embodiments of the present disclosure are applicable.

FIG. 12 is a diagram illustrating an exemplary OTDOA positioning method to which various embodiments of the present disclosure are applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi, 1 \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_i, y_i\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

2.5.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type 1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.5.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6 Quasi Co-Located or Quasi Co-Location (QCL)

The UE may receive a list of up to M TCI-State configurations to decode a PDSCH according to a detected PDCCH carrying DCI intended for a given cell. M depends on a UE capability.

Each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

2.7 Beam Management

Beam management (BM) is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its transmission (Tx) beam/reception (Rx) beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam.

2.7.1 DL Beam Management (BM) Procedure

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 13:
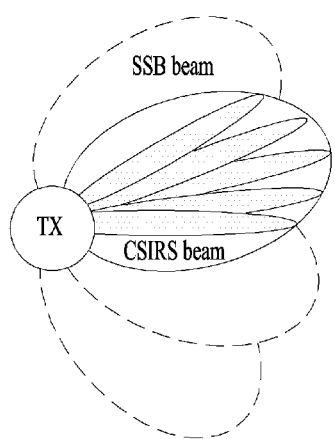
FIG. 13 is a diagram illustrating exemplary beamforming using an SSB and a channel state information reference signal (CSI-RS), to which various embodiments of the present disclosure are applicable.

FIG. 13 is a diagram illustrating exemplary beamforming using an SSB and a CSI-RS.

Figure 14:
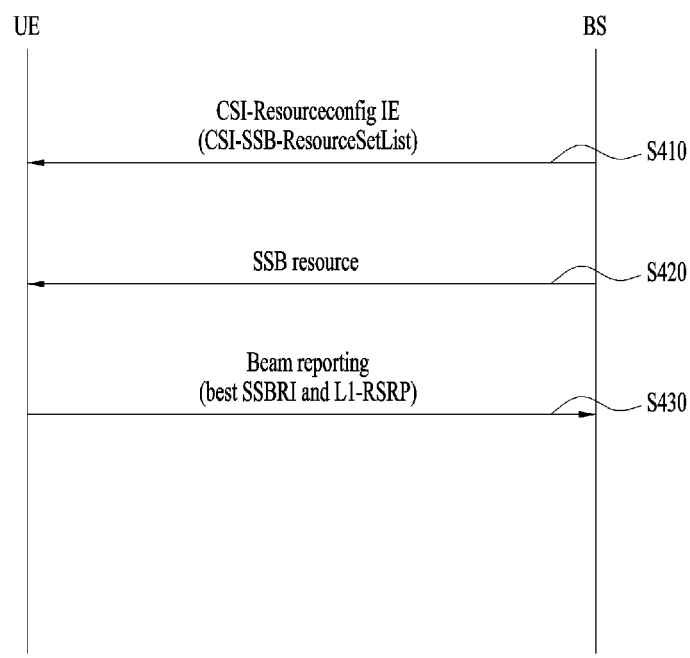
FIG. 14 is a diagram illustrating a signal flow for an exemplary SSB-based downlink (DL) beam management (BM) process to which various embodiments of the present disclosure are applicable.

Referring to FIG. 13, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts 2.7.1.1. DL BM Using SSB FIG. 14 is a flowchart illustrating an exemplary DL BM process using an SSB.

An SSB-based beam report is configured during CSI/beam configuration in RRC_CONNECTED mode A UE receives a CSI-ResourceConfig information element (IE) including CSI-SSB-ResourceSetList for SSB resources used for BM from a BS (S1610). The RRC parameter, csi-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S420).

When CSI-RS reportConfig related to an SSBRI and RSRP reporting has been configured, the UE reports a best SSBRI and an RSRP corresponding to the best SSBRI to the BS (S1630). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2.7.1.2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is not configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 15:
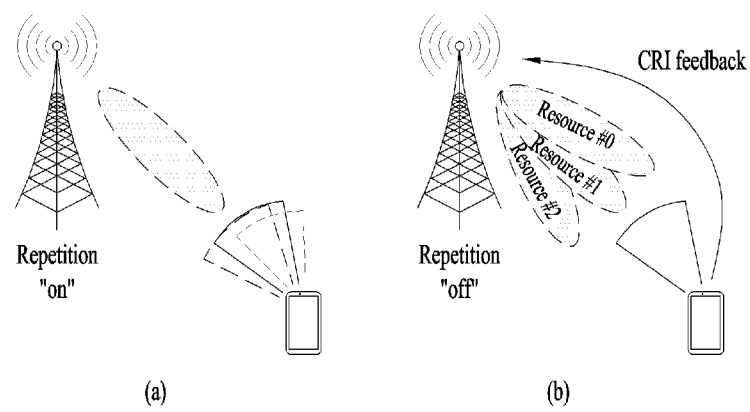
FIG. 15 is a diagram illustrating another exemplary CSI-RS-based DL BM process to which various embodiments of the present disclosure are applicable.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 15 illustrates another exemplary DL BM process using a CSI-RS.

Figure 16:
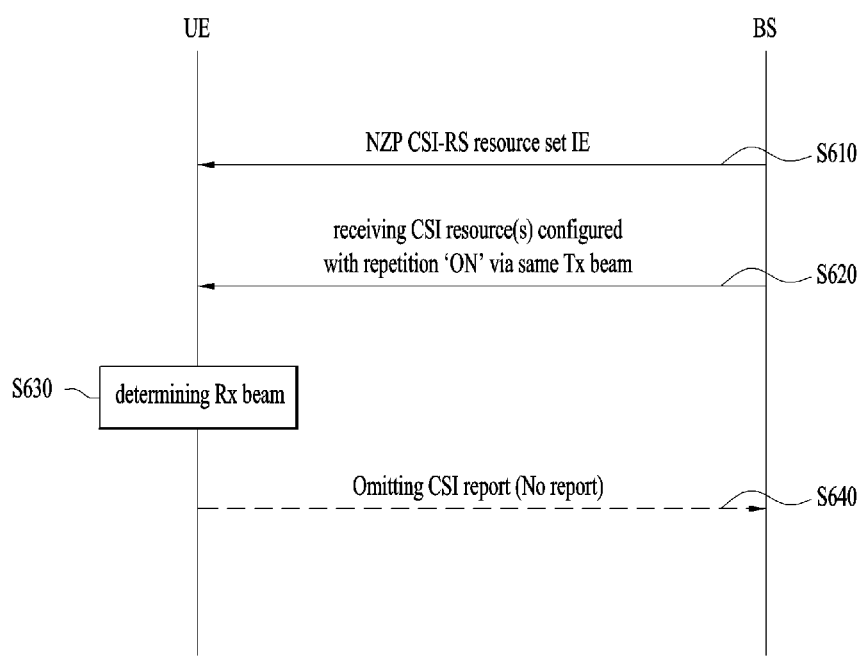
FIG. 16 is a diagram illustrating a signal flow for an exemplary process of determining a reception beam at a UE, to which various embodiments of the present disclosure are applicable.

FIG. 16 is a flowchart illustrating an exemplary Rx beam determination process of a UE.

The UE receives an NZP CSI-RS resource set IE including an RRC parameter 'repetition' from a BS by RRC signaling (S610). The RRC parameter 'repetition' is set to 'ON' herein.

The UE repeatedly receives signals in resource(s) of a CSI-RS resource set for which the RRC parameter 'repetition' is set to 'ON' on the same Tx beam (or DL spatial domain Tx filter) of the BS in different OFDM symbols (S620).

The UE determines its Rx beam (S630).

The UE skips CSI reporting (S640). That is, the UE may skip CSI reporting, when the RRC parameter 'repetition' is set to 'ON'.

Figure 17:
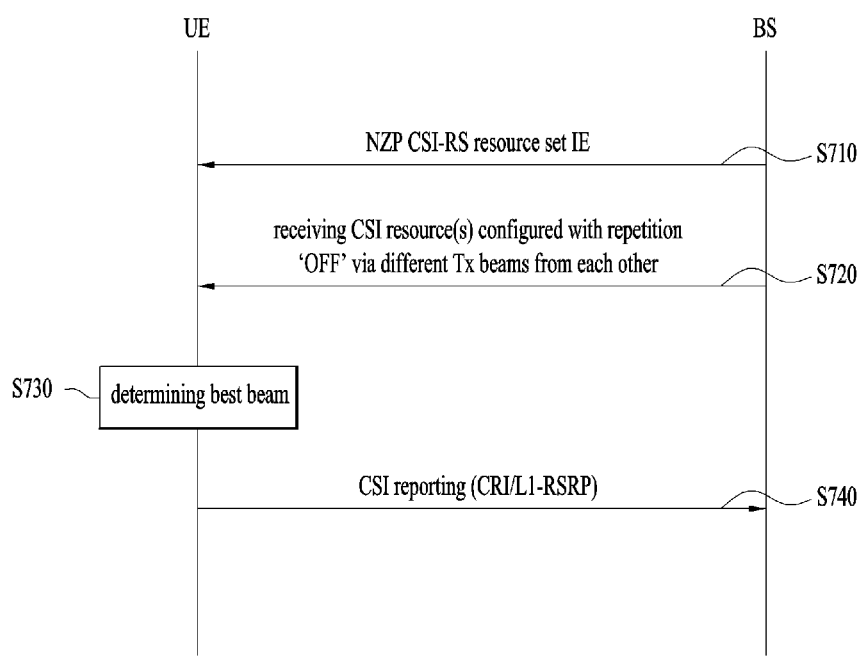
FIG. 17 is a diagram illustrating a signal flow for an exemplary process of determining a transmission beam at a base station (BS), to which various embodiments of the present disclosure are applicable.

FIG. 17 is a flowchart illustrating an exemplary Tx beam determination process of a BS.

- A UE receives an NZP CSI-RS resource set IE including an RRC parameter 'Repetition' from the BS by RRC signaling (S710). When the RRC parameter 'repetition' is set to 'OFF', this is related to a Tx beam sweeping process of the BS.
- The UE receives signals in resource(s) of a CSI-RS resource set for which the RRC parameter 'Repetition' is set to 'OFF' on different Tx beams (or DL spatial domain Tx filters) of the BS (S720).
- The UE selects (or determines) a best beam (S740).
- The UE reports the ID (e.g., CRI) of the selected beam and related quality information (e.g., an RSRP) to the BS (S1740). That is, the UE reports a CRI and an RSRP corresponding to the CRI, when a CSI-RS is transmitted for BM.

Figure 18:
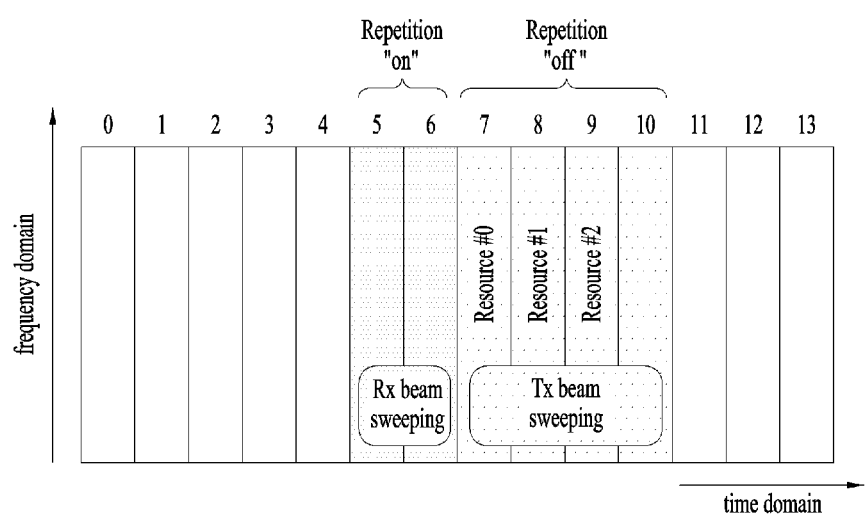
FIG. 18 is a diagram illustrating an exemplary time and frequency-domain resource allocation related to the operation of FIG. 15, to which various embodiments of the present disclosure are applicable.

FIG. 18 is a diagram illustrating exemplary resource allocation in the time and frequency domains, which is related to the operation of FIG. 15.

When repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

2.7.1.3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 10 describes an example of a TCI-State IE. The TC-State IE is related to a QCL type corresponding to one or two DL RSs.

TABLE 10

```
-- ASN1START
-- TAG-TCI-STATE-START
TCI-State ::=          SEQUENCE {
    tci-StateId            TCI-StateId,
    qcl-Type1              QCL-Info,
    qcl-Type2              QCL-Info
    ...
}
QCL-Info ::=           SEQUENCE {
    cell                   ServCellIndex
    bwp-Id                 BWP-Id
    referenceSignal        CHOICE {
        csi-rs                 NZP-CSI-RS-ResourceId,
        ssb                    SSB-Index
    },
    qcl-Type               ENUMERATED {typeA, typeB, typeC, typeD},
    ...
}
-- TAG-TCI-STATE-STOP
-- ASN1STOP
```

In Table 10, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

2.7.3 UL Beam Management (BM) Process

In UL BM, reciprocity (or beam correspondence) between a Tx beam and an Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use a UL BM process for determining a DL Tx beam even if the UE does not request a report of a (preferred) beam.

UM BM may be performed by beamformed UL SRS transmission, and whether to apply UL BM to an SRS resource set is configured by (an RRC parameter) usage. If usage is set to 'BeamManagement (BM)', only one SRS resource in each of a plurality of SRS resource sets may be transmitted in a given time instant.

The UE may be configured with one or more sounding reference symbol (SRS) resource sets configured by (an RRC layer parameter) SRS-ResourceSet (by RRC signaling). For each SRS resource set, the UE may be configured with K>1 SRS resources, where K is a natural number and a maximum value of K is indicated by SRS_capability.

Like DL BM, the UL BM process may be divided into a UE's Tx beam sweeping and a BS's Rx beam sweeping.

In UL BM, reciprocity (or beam correspondence) between a Tx beam and a Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use a UL BM process for determining a DL Tx beam even if the UE does not request a report of a (preferred) beam.

UM BM may be performed by beamformed UL SRS transmission, and whether to apply UL BM to an SRS resource set is configured by (an RRC parameter) usage. If usage is set to 'BeamManagement (BM)', only one SRS resource in each of a plurality of SRS resource sets may be transmitted in a given time instant.

The UE may be configured with one or more sounding reference symbol (SRS) resource sets configured by (an RRC layer parameter) SRS-ResourceSet (by RRC signaling). For each SRS resource set, the UE may be configured with K>1 SRS resources, where K is a natural number and a maximum value of K is indicated by SRS_capability.

Like DL BM, the UL BM process may be divided into a UE's Tx beam sweeping and a BS's Rx beam sweeping.

Figure 19:
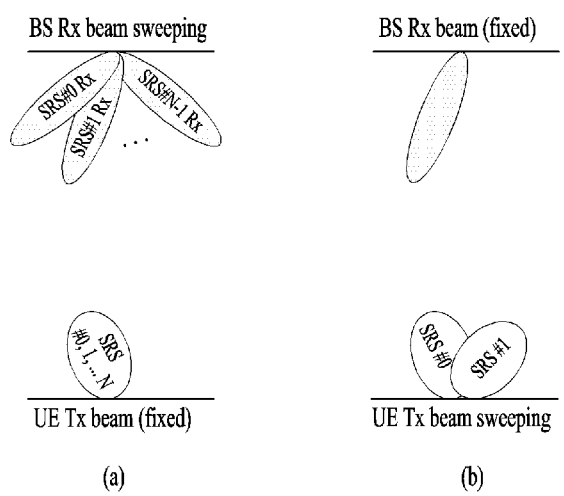
FIG. 19 is a diagram illustrating an exemplary sounding reference signal (SRS)-based uplink (UL) BM process to which various embodiments of the present disclosure are applicable.

FIG. 19 illustrates an exemplary UL BM process using a SRS.

FIG. 19(a) illustrates an Rx beamforming determination procedure of a BS, and FIG. 19(b) illustrates a Tx beam sweeping process of a UE.

Figure 20:
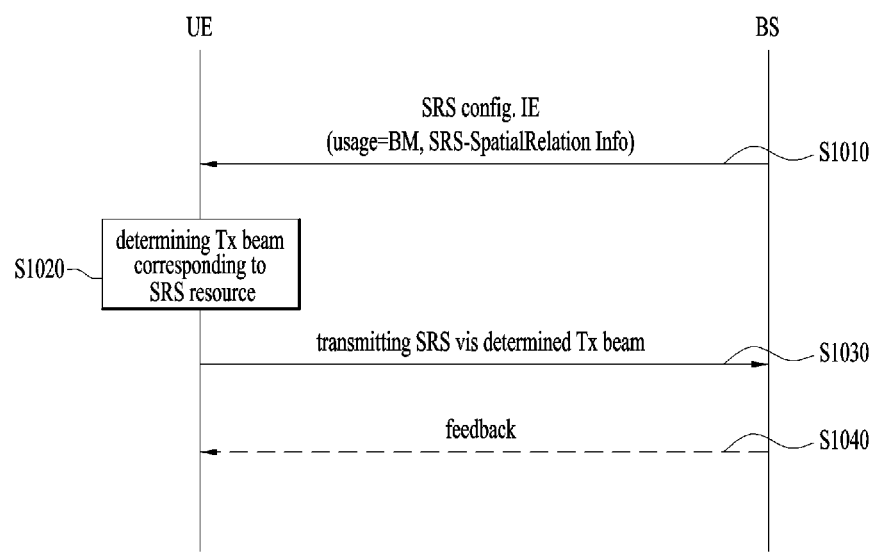
FIG. 20 is a diagram illustrating a signal flow for an exemplary SRS-based UL BM process to which various embodiments of the present disclosure are applicable.

FIG. 20 is a flowchart illustrating an exemplary UL BM process using a SRS.

- The UE receives, from the BS, RRC signaling (e.g., SRS-Config IE) including (an RRC parameter) usage set to 'beam management' (S1010). The SRS-Config IE is used for an SRS transmission configuration. The SRS-Config IE includes an SRS-Resources list and a SRS-ResourceSet list. Each SRS resource set refers to a set of SRS-resources.
- The UE determines Tx beamforming for an SRS resource to be transmitted based on SRS-SpatialRelation Info contained in the SRS-Config IE in (S1020). SRS- SpatialRelation Info is configured per SRS resource and indicates whether to apply the same beamforming as used for an SSB, a CSI-RS, or an SRS on an SRS resource basis.

If SRS-SpatialRelationInfo is configured for the SRS resource, the same beamforming as used for the SSB, the CSI-RS or the SRS is applied for transmission. However, if SRS-SpatialRelationInfo is not configured for the SRS resource, the UE randomly determines Tx beamforming and transmits the SRS by the determined Tx beamforming (S1030).

More specifically, for a P-SRS with 'SRS-ResourceConfigType' set to 'periodic':

i) if SRS-SpatialRelationInfo is set to 'SSB/PBCH,' the UE transmits the corresponding SRS by applying the same spatial domain transmission filter (or generated from the corresponding filter) as the spatial domain Rx filter used for reception of the SSB/PBCH; or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (S1040).

i) If Spatial_Relation_Info is configured for all the SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the STS in the configured SRS resources with the indicated beam, and transmit the SRS in SRS resources for which Spatial_Relation_Info is not configured, by randomly applying Tx beamforming.

3. Method of Effectively Determining or Configuring Transmission/Reception Beam by BS, Transmission Point (TP), or UE, Proposed in the Present Disclosure 3.1. PRS Resources In NR, there is a high probability that a relatively narrow beam is used, and thus a BS/TP or a UE needs to transmit or receive RS(s) (e.g., PRS, CSI-RS, and SSB) by sweeping beams in multiple directions, to perform a UE positioning operation using an appropriate beam. As a result, however, RS overhead may be increased, and RS transmission/reception in an unnecessary direction may cause the problem of wireless resource inefficiency or low RS hearability. In this context, the present disclosure proposes a method of effectively determining/configuring a transmission/reception beam by a BS/TP and/or a UE, and a method of effectively using/configuring a transmission/reception beam by a BS/TP.

In the present disclosure, the terms RS resource and RS resource set are often mentioned. For resources and resource sets for the CSI-RS and the SSB, refer to the background art of this document and TS 38.211 & TS 38.214. An RS resource and resource set for the PRS may be defined similarly. For PRS resources, refer to the following.

3.1.1 Excerpt from Chairman's Notes for 3GPP RAN1 NR-Adhoc Meeting in 2019 January Agreement:
For NR DL PRS resource design:
One antenna port is supported.
FFS: configurable number of antenna ports (more than one) in addition to support of a single port Agreement:
A PRS resource should have a PRS resource ID and a PRS sequence should have a PRS sequence ID Agreement:
NR DL PRS resource is defined as a set of resource elements used for NR DL PRS transmission that can span multiple PRBs within N (1 or more) consecutive symbol(s) within a slot, where N is FFS.
In any OFDM symbol, PRS resource occupies consecutive PRBs
FFS if multiple symbols can be non-consecutive
FFS on PRS Resource Set
FFS: whether support of PRS frequency hopping is needed 3.1.2. Concepts of PRS Resource & PRS Resource Set In order to configure a specific PRS for a UE by, for example, a PRS configuration parameter "PRS-Info" of TS36.355, the concept of a PRS unit/resource and/or a PRS resource group/set may be introduced or defined as a PRS configuration unit. For example, a configuration of a PRS resource ID, an occupied bandwidth, a periodicity, and the number of consecutive slot(s) in which the PRS is continuously transmitted may be included in each PRS resource. One or more PRSs (e.g., PRS resource(s)) may be defined/configured as one PRS resource group/set. For example, multiple PRS IDs may be configured/defined as one PRS group/set.

In the present disclosure, like the PRS configuration parameter "PRS-Info" of TS36.355, a PRS resource is a configuration parameter and/or a configuration unit, which includes, as configuration sub-parameters, multiple parameters that configure a PRS such as a PRS bandwidth, a PRS ID (PRS configuration ID), PRS muting information, the number of slots included in a PRS occasion, and the length of the PRS occasion.

As such, configuring a PRS at a PRS resource level is meaningful in a narrow beam-based system such as NR. In LTE, a single PRS is configured for a reference cell (serving cell) and a neighbor cell/TP because LTE is a wide beam-based system. That is, "PRS-INFO" is configured for each reference cell and neighbor cell. In NR, however, since a specific TP/BS sweeps multiple narrow beams, the TP/BS is highly likely to transmit the PRS with a narrow TX beam (at or above 6 GHz) rather than with a common beam. Since The PRS transmitted through different TX beam(s) may have different measurement values such as ToAs/RSTDs/RSRPs/SNRs from the viewpoint of the UE, the UE needs to distinguish the PRS transmitted through each TX beam. Accordingly, as the PRS is transmitted in a different PRS resource on a different TX beam, the UE may identify that PRSs in different PRS resources are transmitted through different TX beams. Although different PRS resources may share time and/or frequency resource elements (REs), at least different IDs and/or sequences are configured for the different PRS resources so that the UE may distinguish the PRS resources.

3.2. Proposal 1 (DL→UL Order)

(From the perspective of the UE) The UE may receive, through multiple RX beams, an RS (e.g., PRS or CSI-RS) and/or RS resource(s) transmitted in multiple directions (through multiple beams) by a specific BS/TP. For the RS and/or RS resource(s) transmitted in the multiple directions through the multiple beams by the BS/TP, the UE may obtain the propagation time (PT)/TOA/ToF measurements of the RS and/or RS resource(s) transmitted through each TX beam by using one or more RX beams. An RX beam corresponding to the smallest PT/ToA/ToF measurement may be used as a TX beam that transmits a UL RS (e.g., SRS or UL-PRS) for UL-based positioning and/or DL-UL-based joint/hybrid positioning to the BS/TP. The BS/LMF may indicate/configure the UE operation to/for the UE.

(From the perspective of the TP/BS) The UE may report, to the BS/LMF, information about RS resource(s) corresponding to the smallest of PT/ToA/ToF measurements obtained from RS (e.g., PRS or CSI-RS) resource(s) transmitted in multiple directions through multiple TX beams by the specific BS/TP. DL TX beam(s) of the BS/TP corresponding to the information about the RS and/or RS resource(s) (e.g., PRS resource index(es)) reported to the BS/LMF by the UE may be used as RX beam(s) (by the BS/TP) to receive a UL RS (e.g., SRS or UL-PRS) and/or RS resource(s) for UE positioning (in the future) from the UE. The UL RS (e.g., SRS, UL-PRS, or PRACH) and/or RS resource(s) may be transmitted for the purpose of DL-UL-based joint/hybrid positioning as well as for the purpose of UL-based positioning (e.g., UTDOA). The LMF may indicate/configure/recommend the UE operation of reporting an RS and/or RS resource(s) and the operation of the BS/TP for using an RX beam.

In a specific example, it is assumed that the specific TP/BS transmits PRS resources #0, #1, #2, and #3 through two TX beams. It is also assumed that the UE may selectively use two RX beams in total, and the TP/BS transmits PRS resources #0 and #1 by TX beam #0 and PRS resources #2 and #3 by TX beam #1. Each PRS resource is transmitted in a single OFDM symbol, and all PRS resources are multiplexed in time division multiplexing (TDM). That is, the UE may receive PRS resource #0 and PRS resource #1 transmitted through TX beam #0 over two OFDM symbols with RX beam #0 and RX beam #1, and obtain the ToA/PT/ToF measurement of each PRS resource. Similarly, that is, the UE may receive PRS resource #2 and PRS resource #3 transmitted through TX beam #1 over two OFDM symbols with RX beam #0 and RX beam #1, and obtain the ToA/PT/ToF measurement of each PRS resource.

For example, if the PT/ToA measurement of PRS resource #0 received with RX beam #0 is the minimum of the measurements of PRS resources #0, #1, #2, and #3, the UE may use RX beam #0 (a direction corresponding to RX beam #0) as a TX beam for transmitting a UL RS (e.g., SRS or UL-PRS) for UL-based positioning and/or DL-UL-based joint/hybrid positioning. Further, the UE may be configured/indicated to report information about (the resource index of) PRS resource #0 to the BS/LMF. As the UE reports PRS resource index #0 to the BS/LMF, the BS/TP may use TX beam #0 used for transmitting PRS resource #0 as an RX beam for receiving the UL RS (e.g., SRS or UL-PRS) for UL-based positioning and/or DL-UL-based joint/hybrid positioning from the UE. The LMF may indicate/configure/recommend this BS/TP operation.

Additionally, in Proposal 1, the BS/TP may use a DL TX beam corresponding to RS resource index(es) as an RX beam to receive UL RS resource(s) and/or RS resource set(s) (later) based on specific DL RS resource information (e.g., the RS resource index(es)) reported to the LMF/BS by the UE, and additionally use the RS resource information for UE positioning based on information about the angle of departure (AoD) of the TX beam that the LMF/BS used to transmit the DL RS resources, as well. That is, for example, it may be assumed that the BS/TP transmits RS (e.g., PRS or CSI-RS) resource(s) and/or RS resource set(s) through multiple TX beams, for OTDOA-based UE positioning. As described before, the UE may select a PRS resource corresponding to a minimum ToA/PT/ToF, while changing an RX beam. The UE may perform this process with a plurality of TPs/BSs and select a specific one of multiple PRS resources that each TP/BS has transmitted through multiple TX beams. When the UE reports a reference signal timing difference (RSTD) based on the ToA/PT/ToF corresponding to the selected PRS resource to the LMF/BS, the LMF/BS may perform OTDOA-based UE positioning.

As the UE reports information about the selected RS resource (RS resource index) for each TP/BS as well as the RSTD to the LMF/BS (information about a TP/cell associated with each RS resource may also be reported), OTDOA-based UE positioning and AoD-based UE positioning may be performed, and each TP/BS may also use a DL TX beam used for transmitting the RS resource by the TP/BS as an RX beam to receive UL RS resource(s) and/or RS resource set(s) (later) from the UE. As described before, the UE may also determine an RX beam used to receive the RS resource as a TX beam for transmitting UL RS resource(s) and/or RS resource set(s) (later).

Proposal 1 is a method in which the BS first transmits a DL RS (e.g., PRS) in multiple directions by TX beam sweeping (switching), for UE positioning, and then the UE performs measurement, configures/determines a TX beam for use in transmitting a UL RS later, and reports measurement information to the BS/LMF, so that the BS determines/configures an RX beam for use in receiving the UL RS later. On the contrary, a method in which the UE first transmits a UL RS, the BS/TP determines/configures a TX beam for use in transmitting a DL RS based on measurement of the UL RS, and the UE determines/configures an RX beam for use in receiving the DL RS may be considered. This method will be described below in detail.

3.3. Proposal 1 (UL→DL Order)

(From the perspective of the TP/BS) The TP/BS may receive, through multiple RX beams, an RS (e.g., SRS or UL-PRS) and/or RS resource(s) transmitted in multiple directions (through multiple beams) by a specific UE. For the RS and/or RS resource(s) transmitted in the multiple directions through the multiple beams by the UE, the TP/BS may obtain the PT/TOA/ToF measurements of the RS and/or RS resource(s) transmitted through each TX beam of the UE by using one or more RX beams. An RX beam corresponding to the smallest PT/ToA/ToF measurement may be used as a TX beam that transmits a DL RS (e.g., PRS, CSI-RS, or SSB) for DL-based positioning and/or DL-UL-based joint/hybrid positioning to the UE. The BS/LMF may indicate/configure this UE operation to/for the UE. The LMF may configure/indicate the BS operation.

(From the perspective of the UE) The BS may indicate/configure, to/for the UE, information about RS resource(s) corresponding to the smallest of PT/ToA/ToF measurements obtained from RS (e.g., SRS or UL-PRS) resource(s) transmitted in multiple directions through multiple TX beams by the specific UE. UL TX beam(s) of the UE corresponding to the information about the RS and/or RS resource(s) (e.g., SRS resource index(es)) reported to the UE by the BS may be used as RX beam(s) (by the UE) to receive a DL RS (e.g., PRS, CSI-RS, or SSB) and/or RS resource(s) for UE positioning (in the future) from the TP/BS. The DL RS (e.g., PRS, CSI-RS, or SSB) and/or RS resource(s) may be transmitted for the purpose of DL-UL-based joint/hybrid positioning as well as for the purpose of DL-based positioning (e.g., OTDOA). The BS/LMF may indicate/configure the UE operation.

In Proposal 1 and Proposal 2, a minimum PT/ToA/ToF measurement is proposed as a criterion for the UE to select and report a specific RS resource from among RS (e.g., CSI-RS or PRS) resource(s) transmitted from a specific TP/BS. However, instead of this criterion, a specific RS resource may be selected and reported from among RS (e.g., CSI-RS or PRS) resources transmitted from each specific TP/BS based on a maximum RSRP. This characteristic may be equally applied to RS (SRS or UL-PRS) resource(s) transmitted to the BS by the UE.

Figure 21:
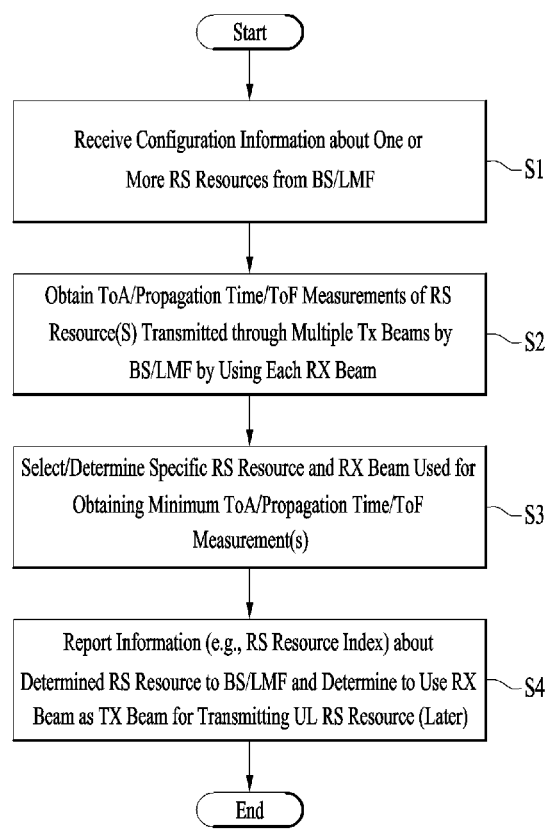
FIG. 21 is a flowchart illustrating a UE operation process according to various embodiments of the present disclosure.
Figure 22:
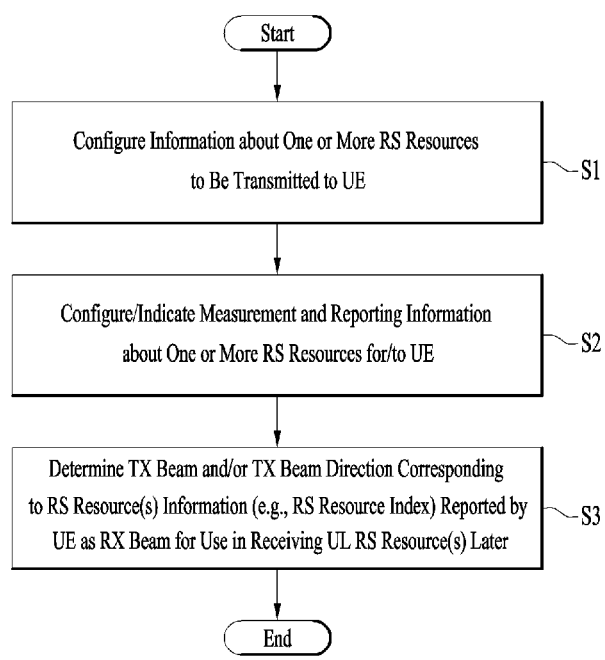
FIG. 22 is a flowchart illustrating a BS operation process according to various embodiments of the present disclosure.

In relation to Proposal 1, a flowchart of a UE operation and a flowchart of a BS/LMF operation may be illustrated in FIGS. 21 and 22, respectively. In addition, the steps of each of the flowcharts may be performed simultaneously or independently. Alternatively, some of the steps may be performed in a changed order.

Additionally, in Proposal 2, the UE may use information about specific UL RS (e.g., SRS) resource(s) (e.g., RS resource index) indicated to the UE by the BS to use a UL TX beam corresponding to the RS resource index(es) as an RX beam for receiving DL RS resource(s) and/or RS resource set (note: a criterion for selecting and indicating the RS resource is determined according to Proposal 2) and perform UE positioning (additionally) using information about the AoD of the TX beam used for transmitting the RS resource by the UE and information about the angle of arrival of the TX beam that the TP/BS receiving the RS resource has measured. The UE may signal the information about the RS resource index(s) received from the BS to the LMF. The BS/LMF may indicate/configure the UE operation. For example, although for UTDOA-based UE positioning, the UE transmits SRS resource(s), the BS may indicate specific RS resource information (e.g., an RS resource index) to the UE (according to the rule of Proposal 2 above), and the UE may signal information about the AoD of the TX beam corresponding to this RS resource index to the LMF. The LMF may configure/indicate the UE operation and/or the BS operation. Alternatively, the UE may inform the LMF of information about the direction and/or angle of the TX beam that the UE has used for transmitting the UL RS (e.g., SRS) resources. In this case, the BS may notify the LMF of the UL RS resource information (RS resource index) received from the UE, so that UE positioning may be performed using UL AoD in addition to UTDOA. Therefore, the accuracy of UE positioning may be increased.

For DL-based OTDOA UE positioning, DL-UL-based multi-cell RTT-based positioning, and UE positioning based on information about the AoDs of beams transmitted from multiple cells, a plurality of cells/TP/gNBs need to transmit RSs (e.g., PRSs, CSI-RSs, or SSBs).

When multiple cells/BSs/TPs transmit RSs (e.g., PRSs) while sweeping (switching) TX beams, a huge amount of time-frequency resources may be required, and latency may be increased. Accordingly, when a specific cell/TP/BS transmits an RS (or RS resource(s)), reference information for the direction of a used TB beam is important.

3.4. Proposal 3 (CID/ECID+OTDOA/Multi-Cell RTT/ Multi-Cell AoD)

The LMF/location server may identify a cell in which a UE is located and/or a sector or portion of the cell in which the UE is located by a CID/ECIF technique. The LMF may configure/indicate/recommend a TX beam direction for use in transmitting RS (e.g., PRS) resource(s) for/to the BS/TP by using this information.

The LMF may indicate specific logical/physical/global cell-ID information as reference information for TX beam direction(s) for use in transmission of RS (e.g., PRS) resource(s) and RS resource set(s) at a specific cell/BS/TP. And/or the LMF may configure/indicate to the BS to transmit specific RS resource(s) and/or RS resource set(s) in a direction corresponding to the logical/physical/global cell-ID.

Further, the BS (a specific wireless network BS or a specific BS/cloud-entity having deployment/location information about multiple cells/BSs and responsible for scheduling between cells) may request reference TX beam direction information for RS (e.g., PRS) resource(s) and/or RS resource set(s) transmitted by specific BS(s)/cell(s) and/or TP(s) to the LMF.

In addition to the logical/physical/global cell-ID information, the LMF may indicate to the BS information about a cell portion (e.g., a cell portion ID) in which the UE is located in the cell and/or information about a sector in which the UE is located in the cell.

Each BS/cell/TP may transmit independent RS resource(s), that is, the TP/cell/BS may use the RS resource(s) completely independently without sharing the RS resource(s). In this regard, the LMF may indicate to the BS information about specific RS resource(s) and/or RS resource set(s) as reference TX beam information for use in transmitting specific RS (e.g., PRS) resource(s) and/or RS resource set(s) at the specific BS/TP/cell.

And/or, the TX beam reference information for the RS resource(s) and/or the RS resource set(s) transmitted from the specific cell/BS/TP may be "information about one or more specific buildings (e.g., the name/location of a building or information about a specific store/building such as the first Starbucks)", "specific coordinate information in global coordinates (when the LMF knows an approximate location of the UE, the LMF may roughly predict where the UE is)", or "specific road information".

Figure 23:
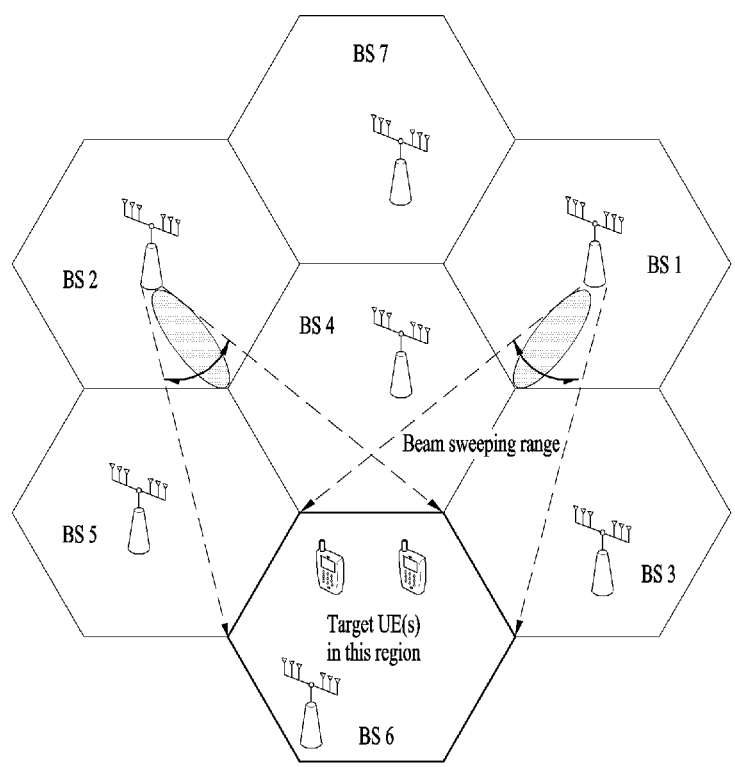
FIG. 23 is a diagram illustrating a reference signal (RS) transmission in a multi-cell scenario for UE positioning according to various embodiments of the present disclosure.

For example, it may be considered to use the ECID technique and the OTDOA technique together, and for this, FIG. 23 may be referred to. In FIG. 23, it may be assume that BS1 and BS2 transmit specific RS (e.g., PRS) resource(s) to a UE in BS6 as a target. The LMF/location server may inform information about BS6 as reference TX beam information for the RS resource(s) transmitted by BS1 and BS2. Alternatively, the LMF may indicate to/configure BS1 and BS2 to transmit the RS resource(s) in the direction of BS6.

(UE-based) The LMF/BS may indicate, to the UE, information about RS resource(s) and/or RS resource set(s) transmitted from a specific BS/cell/TP and reference information for a TX beam used to transmit the RS resource(s) and/or the RS resource set(s). When the UE has knowledge of location information about the specific or all BSs/cells/TPs, the UE may determine an RX beam direction based on the indicated information. In addition, the UE may use the Rx beam as a TX beam for transmitting UL RS (e.g., SRS) resource(s) to the TP/cell/BS, for UL-based positioning and/or UL-DL-based hybrid positioning. The BS/LMF may indicate/configure the UE operation. Therefore, since the UE may autonomously limit an RX beam direction range to a specific direction, the RX beam sweeping-incurred latency increase may be reduced, and RS (e.g., PRS) hearability may be increased.

Figure 25:
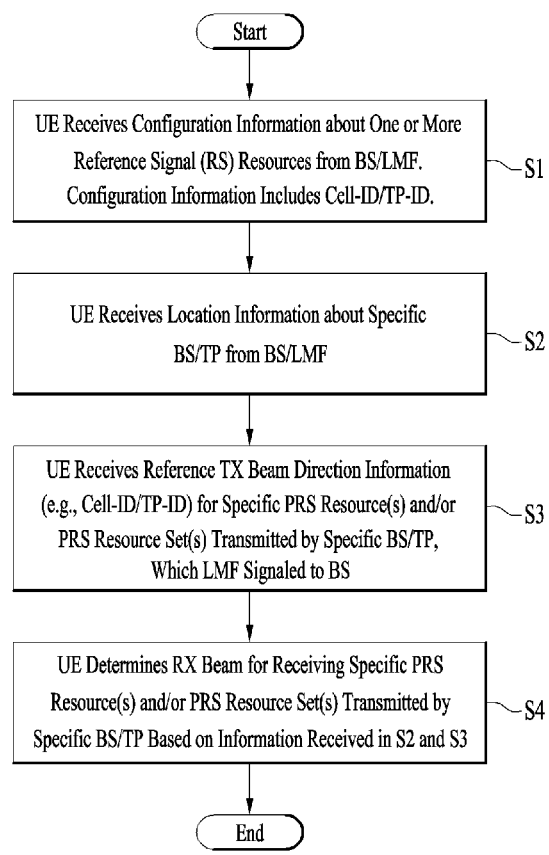
FIG. 25 is a flowchart illustrating a UE operation process according to various embodiments of the present disclosure.

In relation to Proposal 3, when the UE may receive location information about a BS/TP from the BS/LMF, the UE may determine/configure an RX beam for receiving specific PRS resource(s) and/or PRS resource set(s) from each TP/BS. A flowchart illustrating this operation may be illustrated in FIG. 25.

Figure 24:
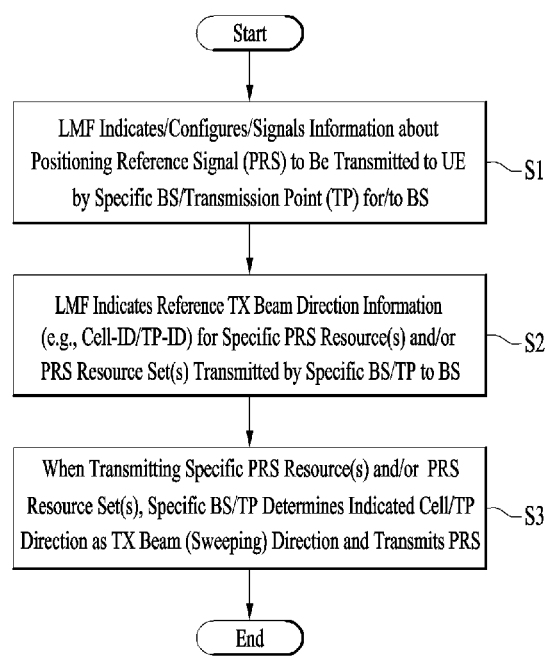
FIG. 24 is a flowchart illustrating a BS and location management function (LMF) operation process according to various embodiments of the present disclosure.

In relation to Proposal 3, a flowchart of a BS and LMF operation may be illustrated in FIG. 24. In addition, the steps of the flowchart may be performed simultaneously or independently. Alternatively, some of the steps may be performed in a changed order.

In an example of the present disclosure, ECID/CID+ multi-cell RTT-based UE positioning may be performed in the following procedure in consideration of all of Proposal 1, Proposal 2, and Proposal 3.

First, the LMF obtains information about a cell or a cell portion in which the UE is located by a CID/ECID technique.

The LMF configures/indicates a cell ID and/or a cell portion ID as a reference TX beam direction to be used for L (>0) BSs to transmit PRS resource(s) to a target UE for positioning.

Each of the L (>0) BSs determines a TX beam sweeping range required for RS transmission based on the TX beam direction information indicated by the LMF and transmits PRS resource(s).

The UE obtains "ToA/PT" measurement(s) of multiple RS resource(s) received from each BS, while sweeping a plurality of RX beams and calculates an "RX-TX" time difference based on the smallest of the obtained "ToA/PT" measurements. The UE reports the "RX-TX" time difference and an RS resource index corresponding to the minimum measurement to the LMF/BS.

The UE transmits UL RS (e.g., SRS) resource(s) to the L BSs as targets, for multi-cell RTT-based UE positioning. The UE uses an RX beam corresponding to the minimum "ToA/PA" for each BS in the fourth procedure as a TX beam for transmitting SRS resource(s) to the BS.

When receiving the SRS resource(s) from the UE, each BS uses a DL TX beam corresponding to the RS resource index reported by the UE in the fourth procedure as an RX beam for receiving the SRS resource(s).

As a consequence, the above procedure may prevent a BS/TP from transmitting RS resource(s) in an unnecessary direction by TX beam sweeping (switching), for UE positioning. Therefore, when an RS is transmitted in the same time-frequency radio resources, hearability may be increased at the UE. Alternatively, from the perspective of obtaining the same hearability performance, the efficient use of time and spatial frequency resources carrying an RS for positioning in multiple cells may reduce latency required for the UE to receive RSs from the multiple cells.

4. Various Embodiments of the Present Disclosure

Various embodiments of the present disclosure will be described below in greater detail based on the above-described technical idea. Clause 1 to clause 3 may be applied to the various embodiments of the present disclosure described below. For example, operations, functions, and terms which are not defined in the various embodiments of the present disclosure described below may be performed and described based on clause 1 to clause 3.

Symbols/abbreviations/terms used in the description of various embodiments of the present disclosure may be given as follows.

AOA (AoA): angle of arrival
CSI-RS: channel state information reference signal
ECID: enhanced cell identifier
GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal
RTT: round trip time
RSTD: reference signal timing difference
SRS: sounding reference signal
TDOA (TDoA): timing difference of arrival
TOA (ToA): time of arrival
TRP: transmission reception point
UTDOA (UTDoA): uplink timing difference of arrival As more and more communication devices have required larger traffic along the trend of the times, a wireless wideband communication system advanced from the LTE system, that is, the next-generation 5G system is required. This next-generation 5G system is called new RAT (NR), for convenience.

4.1. Initial Network Access and Communication Process

According to various embodiments of the present disclosure, the UE may perform a network access process to perform the above-described/proposed procedures and/or methods. For example, the UE may receive and store system information and configuration information required for the above-described/proposed procedures and/or methods during network access (e.g., BS access). The configuration information required for various embodiments of the present disclosure may be received by higher-layer signaling (e.g., RRC signaling or MAC-layer signaling).

Figure 26:
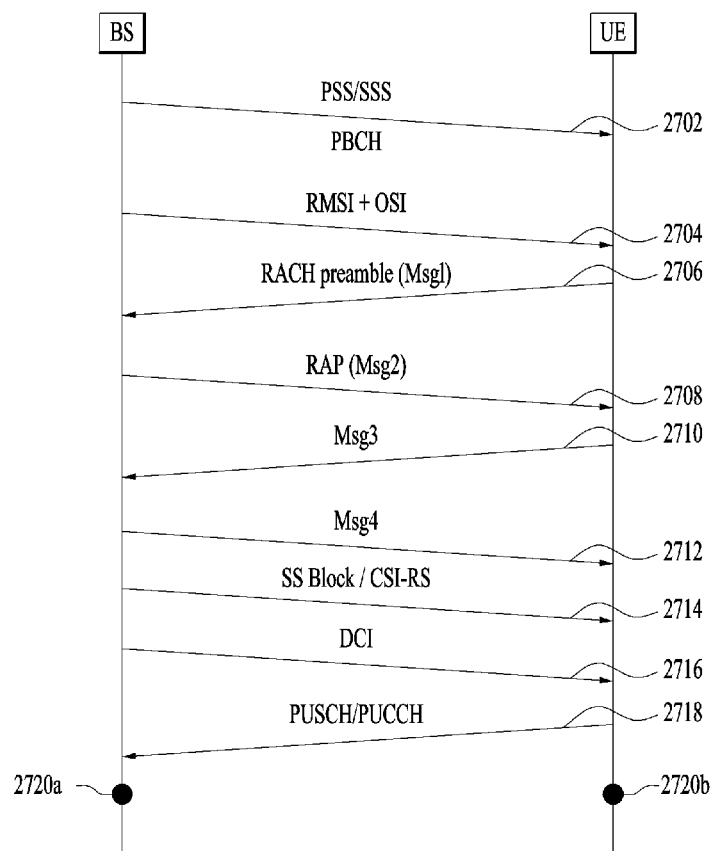
FIG. 26 is a simplified diagram illustrating a signal flow for an initial network access and subsequent communication process according to various embodiments of the present disclosure.

FIG. 26 is a diagram illustrating an initial network access and subsequent communication process according to various embodiments of the present disclosure. In the NR system to which various embodiments of the present disclosure are applicable, a physical channel and an RS may be transmitted by beamforming. When beamforming-based signal transmission is supported, beam management may follow for beam alignment between a BS and a UE. Further, a signal proposed in various embodiments of the present disclosure may be transmitted/received by beamforming. In RRC_IDLE mode, beam alignment may be performed based on an SSB (or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be skipped in the following description.

Referring to FIG. 26, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1 (Msg1)) in PRACH resources linked/corresponding to the index (i.e., beam) of the best SSB (2706). The beam direction of the RACH preamble is associated with the PRACH resources. Association between PRACH resources (and/or RACH preambles) and SSBs (SSB indexes) may be configured by system information (e.g., RMSI). Subsequently, as a part of an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Subsequently, the UE and the BS may perform the above-described/proposed procedures and/or methods. For example, the UE and the BS may transmit a wireless signal by processing information stored in a memory or may process a received wireless signal and store the processed signal in a memory according to the proposal of the present disclosure, based on configuration information obtained in a network access process (e.g., a system information acquisition process, an RRC connection process on an RACH, and so on). The wireless signal may include at least one of a PDCCH, a PDSCH, or an RS on DL and at least one of a PUCCH, a PUSCH, or an SRS on UL.

Particularly in embodiments of the present disclosure, the RS may be the PRS, and the information transmitted on the UL may be additional location-related information about the UE obtained through sensors mounted in the UE according to embodiments of the present disclosure.

Further, the embodiments of the present disclosure are not necessarily performed after steps S2720a and S2720b. For example, when an RRC connection is established between the UE and the BS after step S712, the embodiments of the present disclosure may be performed without the subsequent steps to step S2714 or along with the subsequent steps to step S714.

The LMF mentioned in the present disclosure may be regarded as the location server, and/or may be a higher layer/entity containing the location server in concept.

4.2. Discontinuous Reception (DRX) Operation

Figure 27:
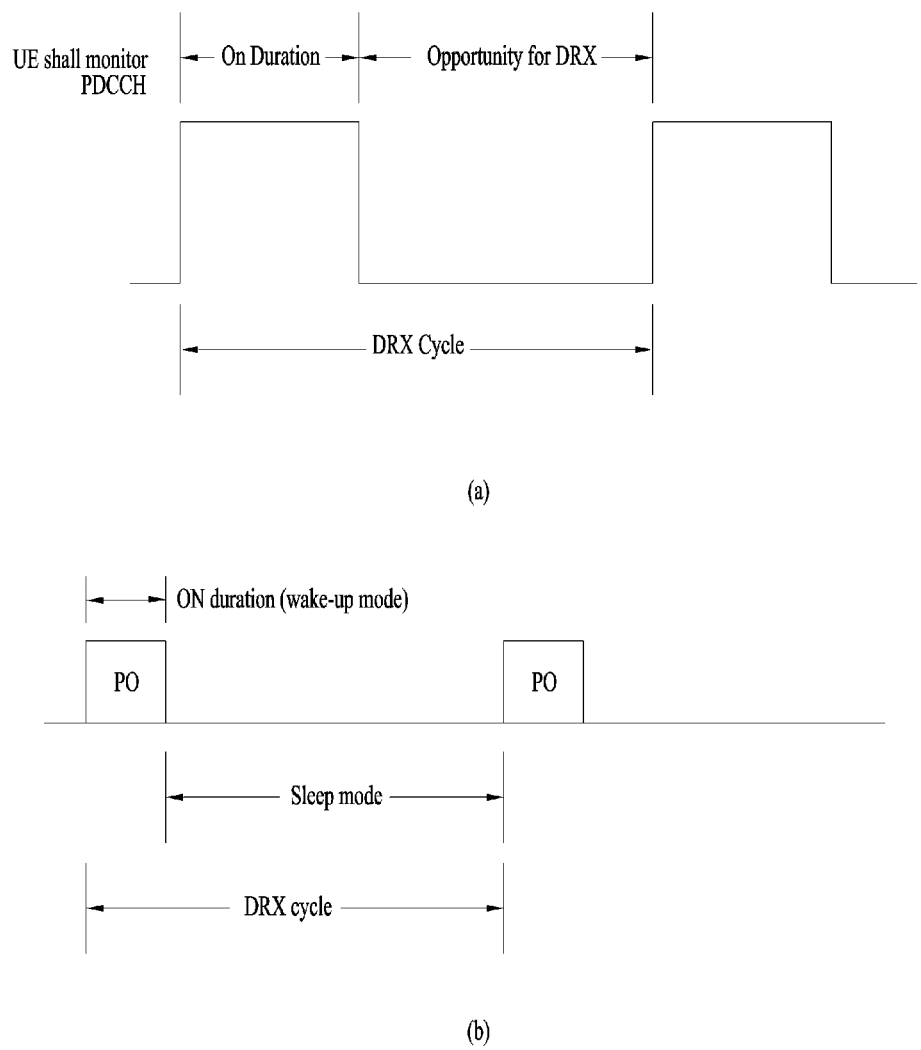
FIG. 27 is a diagram illustrating an exemplary discontinuous reception (DRX) operation according to various embodiments of the present disclosure.

FIG. 27 is a diagram illustrating a DRX operation according to various embodiments of the present disclosure.

A UE may perform a DRX operation in the afore-described/proposed procedures and/or methods according to various embodiments of the present disclosure. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state.

4.2.1. RRC_CONNECTED DRX

In the RRC_CONNECTED state, DRX is used for discontinuous PDCCH reception. For convenience, DRX performed in the RRC_CONNECTED state will be referred to as RRC_CONNECTED DRX.

Referring to FIG. 27(a), a DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 11 describes a UE operation related to DRX (in the RRC_CONNECTED state). Referring to Table 11, DRX configuration information is received by higher-layer (e.g., RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure.

TABLE 11

|  | Type of signals | UE procedure |
| --- | --- | --- |
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the length of the starting duration of a DRX cycle.
- Value of drx-InactivityTimer: defines the length of a time duration in which the UE is in the awake state after a PDCCH occasion in which a PDCCH indicating initial UL or DL data has been detected.
- Value of drx-HARQ-RTT-TimerDL: defines the length of a maximum time duration from reception of a DL initial transmission to reception of a DL retransmission.
- Value of drx-HARQ-RTT-TimerDL: defines the length of a maximum time duration from reception of a grant for a DL initial transmission to reception of a grant for a UL retransmission.
- drx-LongCycleStartOffset: defines the time duration and starting time of a DRX cycle.
- drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

4.2.2. RRC_IDLE DRX

In the RRC_IDLE state and the RRC_INACTIVE state, DRX is used for discontinuous paging signal reception. For convenience, DRX performed in the RRC_IDLE (or RRC_INACTIVE) state will be referred to as RRC_IDLE DRX.

Therefore, when DRX is configured, a PDCCH monitoring/reception may be performed discontinuously in the time domain in the afore-described/proposed procedures and/or methods.

Referring to FIG. 27(b), DRX may be configured for discontinuous reception of a paging signal. The UE may receive DRX configuration information from the BS by higher-layer signaling (e.g., RRC signaling). The DRX configuration information may include configuration information about a DRX cycle, a DRX offset, and a DRX timer. The UE repeats an on duration and a sleep duration according to a DRX cycle. The UE operates in wakeup mode during the on duration, and in sleep mode during the sleep duration. In the wakeup mode, the UE may monitor a paging occasion (PO) to receive a paging message. A PO is a time resource/period (e.g., a subframe or a slot) in which the UE expects to receive a paging message. PO monitoring includes monitoring a PDCCH scrambled with a P-RNTI (MPDCCH or NPDCCH) (hereinafter, referred to as a paging PDCCH) in a PO. The paging message may be included in the paging PDCCH or in a PDSCH scheduled by the paging PDCCH. One or more POs may be included in a paging frame (PF), and the PF may be configured periodically based on a UE ID. The PF may correspond to one radio frame, and the UE ID may be determined based on the international mobile subscriber identity (IMSI) of the UE. When the UE is configured with DRX, the UE monitors only one PO per DRC cycle. Upon receipt of a paging message indicating changing of the UE ID and/or system information, the UE may perform an RACH procedure to initialize (or reconfigure) a connection with the BS or receive (or obtain) new system information from the BS. Accordingly, the UE may perform PO monitoring discontinuously in the time domain to perform the RACH procedure to establish a connection with the BS or receive (or obtain) new system information from the BS, in performing the afore-described/proposed procedures and/or methods.

Those skilled in the art will clearly understand that the above-described initial access process and/or DRX operation may be combined with the contents of clause 1 to clause 3 to implement other various embodiments of the present disclosure.

A more specific operation of the UE and/or the TP and/or the location server according to various embodiments of the present disclosure may be described and performed based on the afore-described clauses 1 to 3.

Because examples of the above-described proposed methods may also be included as one of the implementation methods of the present disclosure, it is obvious that they may be considered as a kind of proposed method. Further, while the above-described proposed methods may be implemented independently, some of the proposed methods may be combined (or merged). It may be regulated that information indicating whether to apply the various embodiments of the present disclosure described above (or information about the rules of the various embodiments of the present disclosure described above) is indicated by a signal (e.g., a physical-layer signal or a higher-layer signal) predefined for the UE by the BS.

5. Example of Device for Implementing Various Embodiments of the Present Disclosure

5.1. Example of Device to which Various Embodiments of the Present Disclosure are Applied FIG. 28 is a diagram illustrating devices that implement various embodiments of the present disclosure.

Figure 28:
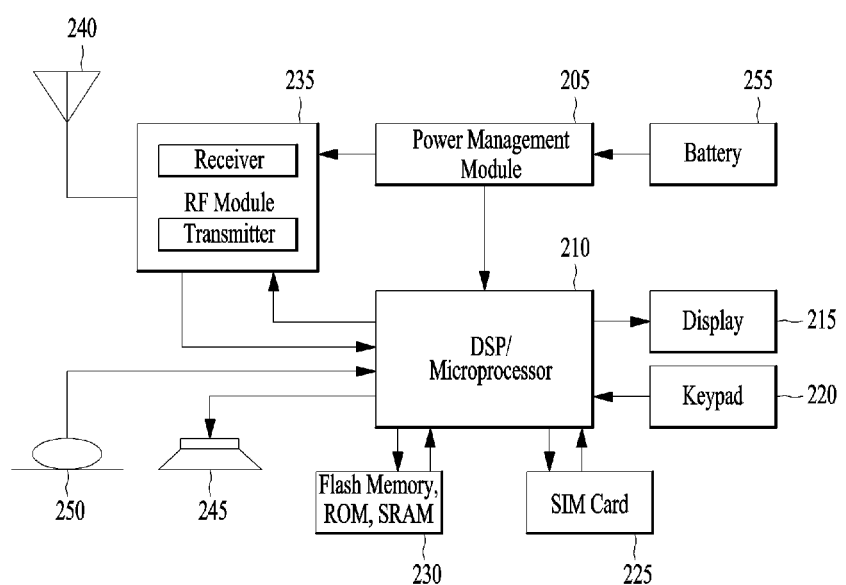
FIG. 28 is a block diagram illustrating a device for implementing various embodiments of the present disclosure.

The devices illustrated in FIG. 28 may be a UE and/or a BS (e.g., eNB or gNB) adapted to perform the afore-described mechanisms, or any device performing the same operation.

Referring to FIG. 28, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 28 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 28 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

According to various embodiments of the present disclosure, a UE (or a communication device included in the UE) and/or a BS (or a communication device included in the BS) and/or a location server (or a communication device included in the location server) may operate as follows by controlling memories.

According to various embodiments of the present disclosure, a UE or a BS or a location server may include at least one transceiver, at least one memory, and at least one processor coupled to the at least one transceiver and the at least one memory. The at least one memory may store instructions causing the A communication device included in the UE or the BS or the location server may be configured to include the at least one processor and the at least one memory. The communication device may be configured to include the at least one transceiver, or may be configured not to include the at least one transceiver but to be connected to the at least one transceiver.

According to various embodiments of the present disclosure, more specific operations of the at least one processor included in the UE and/or the BS and/or the location server may be described and performed based on clause 1 to clause 4.

Unless contradicting each other, various embodiments of the present disclosure may be performed in combination. For example, (a processor included in) a UE and/or a BS and/or a location server according to various embodiment of the present disclosure may perform an operation in a combination of the embodiments described in clause 1 to clause 4, unless contradicting each other.

5.2. Examples of Communication System to which Various Embodiments of the Present Disclosure is Applied Various embodiments of the present disclosure have been described above focusing on a data transmission and reception relationship between a BS and a UE in a wireless communication system, which should not be construed as limiting the present disclosure. For example, various embodiments of the present disclosure may be related to the following technical configurations.

The description, functions, procedures, proposals, methods, and/or operational flowcharts disclosed in various embodiments of the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 29:
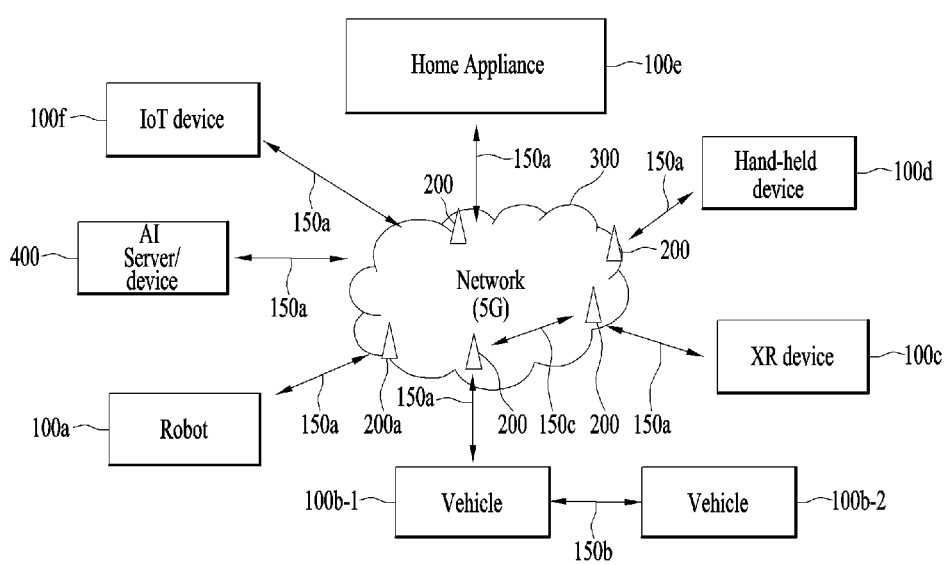
FIG. 29 illustrates wireless devices applicable to various embodiments of the present disclosure.

FIG. 29 illustrates a communication system applied to various embodiments of the present disclosure.

Referring to FIG. 29, a communication system 1 applied to various embodiments of the present disclosure includes wireless devices, BSs, and a network. Here, the wireless devices represent devices performing communication using RAT (e.g., 5G NR) or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, a self-driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 15c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Figure 30:
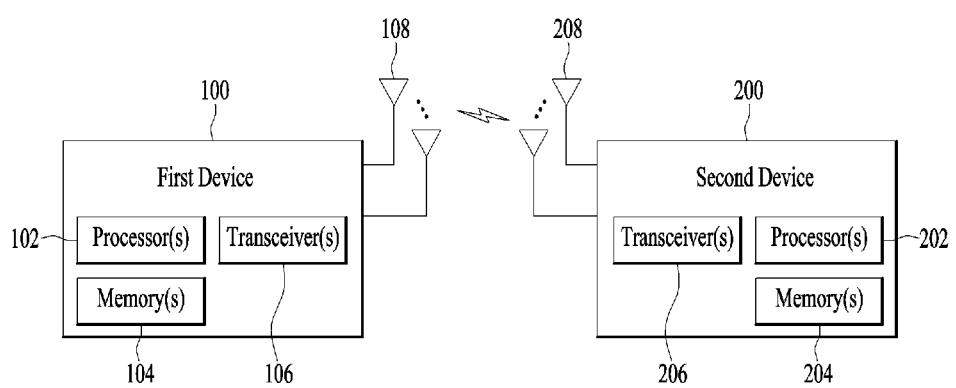
FIG. 30 illustrates another example of a wireless device applied to various embodiments of the present disclosure.

5.2.1 Examples of Wireless Devices to which Various Embodiments of the Present Disclosure is Applied FIG. 30 illustrates wireless devices applicable to various embodiments of the present disclosure.

Referring to FIG. 30, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in various embodiments of the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In various embodiments of various embodiments of the present disclosure, the wireless device may represent the communication modem/circuit/chipset.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in various embodiments of the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in various embodiments of the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In various embodiments of the present disclosure, the wireless device may represent the communication modem/circuit/chipset.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in various embodiments of the present disclosure. The one or more processors 102 and 202 may generate messages, control information, data, or information according to the description, functions, procedures, proposals, methods, and/or operational flowcharts disclosed in various embodiments of the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in various embodiments of the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in various embodiments of the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the various embodiments of present disclosure may be implemented using firmware or software, and the firmware or software may be configured to include the modules, procedures, or functions. Firmware or software configured to perform the description, functions, procedures, proposals, methods, and/or operational flowcharts disclosed in various embodiments of the present disclosure may be included in the one or more processors 102 and 202 or stored in the one or more memories 104 and 204 so as to be driven by the one or more processors 102 and 202. The description, functions, procedures, proposals, and/or methods disclosed in various embodiments of the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of various embodiments of the present disclosure, to one or more other devices. The one or more transceivers 106 and 206 may receive user data, control information, and/or radio signals/channels, mentioned in the description, functions, procedures, proposals, methods, and/or operational flowcharts disclosed in various embodiments of the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in various embodiments of the present disclosure, through the one or more antennas 108 and 208. In various embodiments of the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, at least one memory (e.g., 104 or 204) may store instructions or programs which when executed, cause at least one processor operably coupled to the at least one memory to perform operations according to various embodiments or implementations of the present disclosure.

According to various embodiments of the present disclosure, a computer-readable storage medium may store at least one instruction or computer program which when executed, causes at least one processor to perform operations according to various embodiments or implementations of the present disclosure.

According to various embodiments of the present disclosure, a processing device or apparatus may include at least one processor and at least one memory (e.g., 104 or 204) connectable to the at least one processor. The at last one computer memory may store instructions or programs which when executed, cause the at least one processor operably coupled to the at least one memory to perform operations according to various embodiments or implementations of the present disclosure.

Figure 31:
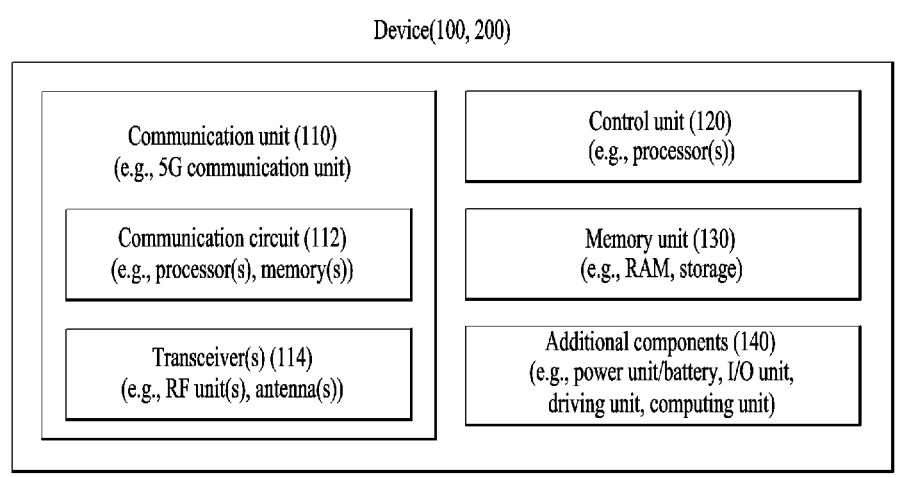
FIG. 31 illustrates a handheld device applied to various embodiments of the present disclosure.

5.2.2. Use Cases of Wireless Devices to which Various Embodiments of Present Disclosure is Applied FIG. 31 illustrates another example of a wireless device applied to various embodiments of the present disclosure. The wireless device may be implemented in various forms according to use cases/services.

Referring to FIG. 31, wireless devices 100 and 200 may correspond to the wireless devices 100 and 200 of FIG. 30 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100*a* of FIG. W1), the vehicles (100*b*-1 and 100*b*-2 of FIG. 30), the XR device (100*c* of FIG. 30), the handheld device (100*d* of FIG. 30), the home appliance (100*e* of FIG. 30), the IoT device (100*f* of FIG. 30), a digital broadcast terminal, a holographic device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use case/service.

In FIG. 31, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an implementation example of FIG. 31 will be described in detail with reference to the drawings.

Figure 32:
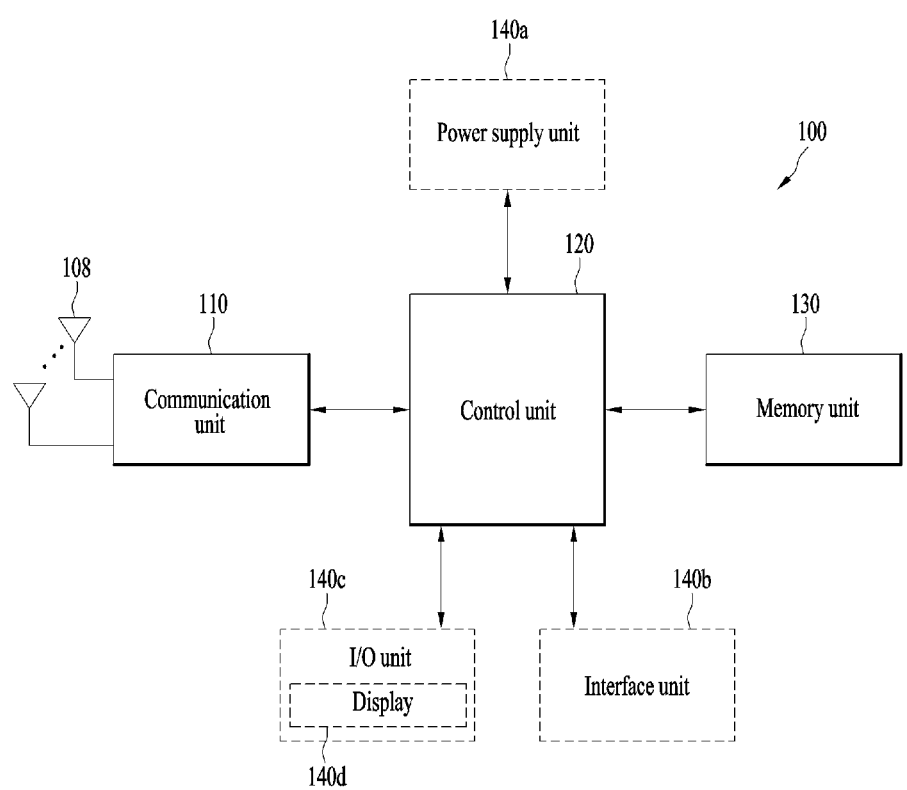
FIG. 32 illustrates a vehicle or an autonomous driving vehicle applied to various embodiments of the present disclosure.

5.2.3. Example of Handheld Device to which Various Embodiments of Present Disclosure is Applied FIG. 32 illustrates a handheld device applied to various embodiments of the present disclosure. The handheld device may include a smartphone, a smartpad, a wearable device (e.g., a smartwatch or smartglasses), or a portable computer (e.g., a notebook). The handheld device may be referred to as an MS, a UT, an MSS, an SS, an AMS, or a WT.

Referring to FIG. 32, a handheld device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 32, respectively.

The communication unit 110 may transmit and receive signals (e.g., data and control signals) to and from other wireless devices or BSs. The control unit 120 may perform various operations by controlling constituent elements of the handheld device 100. The control unit 120 may include an application processor (AP). The memory unit 130 may store data/parameters/programs/code/commands needed to drive the handheld device 100. The memory unit 130 may store input/output data/information. The power supply unit 140*a* may supply power to the handheld device 100 and include a wired/wireless charging circuit, a battery, etc. The interface unit 140b may support connection of the handheld device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 33:
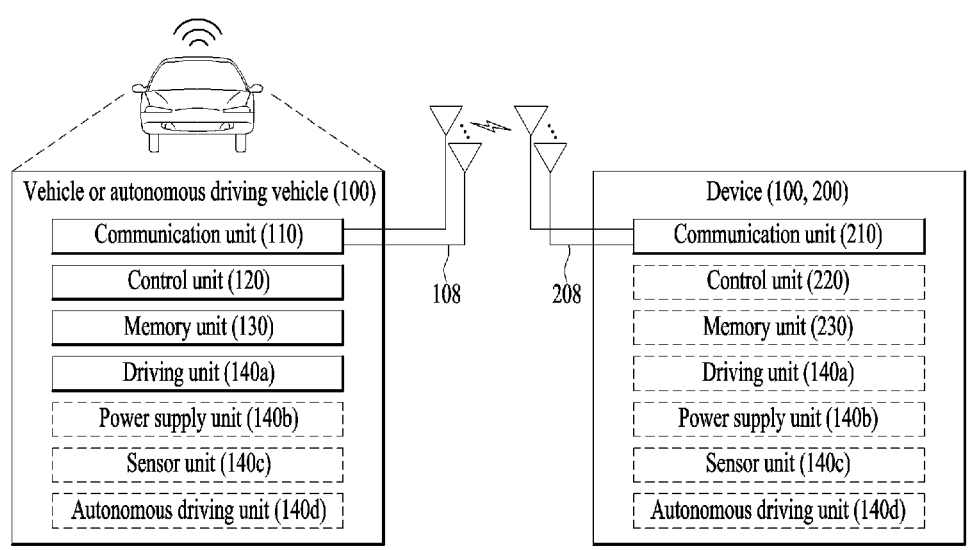
FIG. 33 is a block diagram illustrating an exemplary vehicle or autonomous driving vehicle applied to various embodiments of the present disclosure.

5.2.4. Example of Vehicle or Self-Driving Vehicle to which Various Embodiments of Present Disclosure is Applied FIG. 33 illustrates a vehicle or an autonomous driving vehicle applied to various embodiments of the present disclosure. The vehicle or autonomous driving vehicle may be implemented by a mobile robot, a car, a train, a manned/unmanned aerial vehicle (AV), a ship, etc.

Referring to FIG. 33, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110, 130, and 140a to 140d correspond to the blocks 110, 130, and 140 of FIG. 32, respectively.

The communication unit 110 may transmit and receive signals (e.g., data and control signals) to and from external devices such as other vehicles, BSs (e.g., RSUs), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane in which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 34:
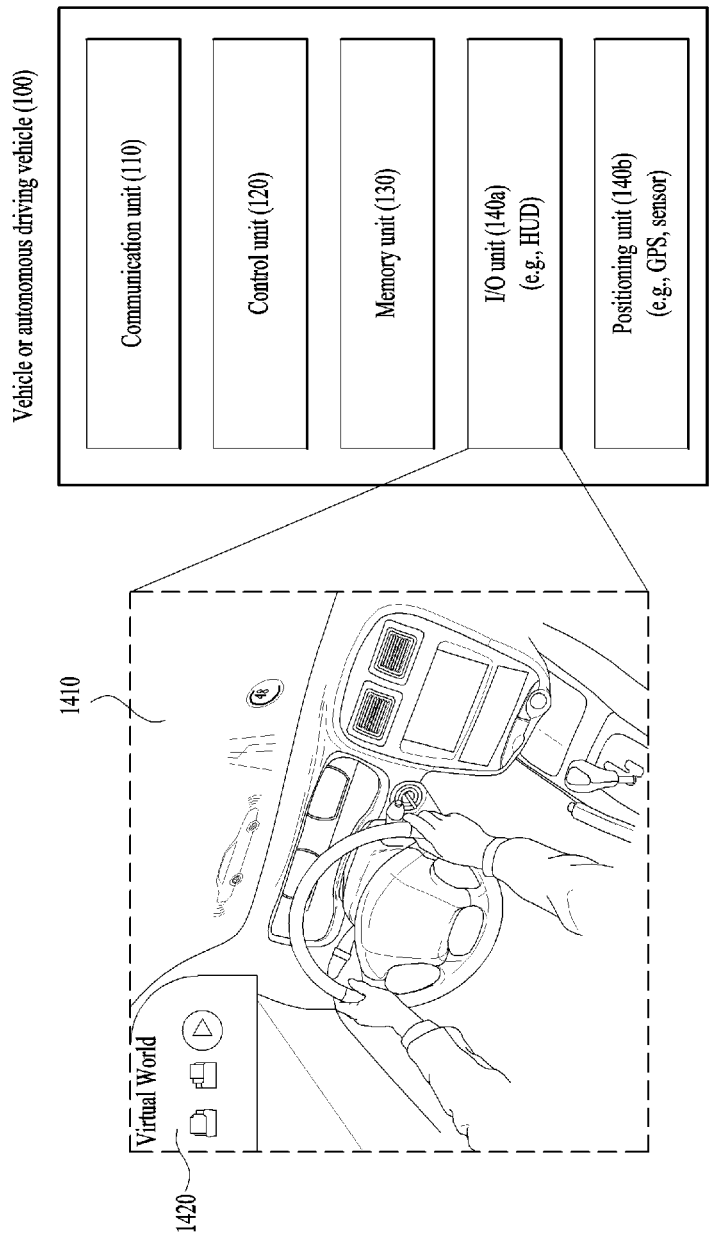
FIG. 34 is a block diagram illustrating a vehicle applied to various embodiments of the present disclosure.

5.2.5. Example of AR/VR and Vehicle to which Various Embodiments of the Present Disclosure FIG. 34 illustrates an exemplary vehicle to which various embodiments of the present disclosure are applied. The vehicle may be implemented as a transportation means, a train, an aircraft, a ship, or the like.

Referring to FIG. 34, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 31.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

For example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method of a user equipment (UE) in a wireless communication system, the method comprising:
receiving configuration information related to at least one downlink positioning reference signal (PRS) resource;
receiving at least one PRS through at least one reception beam of the UE based on the configuration information;
performing a measurement related to the at least one downlink PRS resource based on the received at least one downlink PRS;
determining a measurement value; and
transmitting an uplink signal including the determined measurement value and a downlink PRS resource ID related to the determined measurement value through a transmission beam of the UE,
wherein each downlink PRS resource is transmitted in a single OFDM symbol and two or more downlink PRS resources are multiplexed in time division multiplexing over a transmission beam of a base station (BS) or a transmission point (TP), and
wherein the transmission beam of the UE is determined based on a reception beam having the determined measurement value satisfying any of a number of predefined conditions among the at least one reception beam.

2. The method according to claim 1, wherein the predefined conditions include having a minimum of propagation time (PT), time of arrival (ToA), or time of flight (ToF) measurements of the at least one downlink PRS or having a maximum of reference signal received power (RSRP) measurements of the at least one downlink PRS.

3. The method according to claim 1, further comprising:
receiving location information about the BS or the TP, wherein the configuration information includes information about a cell-identifier (cell-ID) of a cell in which the BS or the TP is located.

4. The method according to claim 3, wherein a direction range for the at least one reception beam of the UE is limited based on the location information and the cell-ID.

5. The method according to claim 1, further comprising:
transmitting information about at least one of a direction of the transmission beam of the BS or the TP or an angle of the transmission beam of the BS or the TP.

6. A user equipment (UE) in a wireless communication system, the UE comprising:
a transceiver; and
at least one processor coupled to the transceiver,
wherein the at least one processor is configured to receive configuration information related to at least one downlink positioning reference signal (PRS) resource, receive at least one PRS through at least one reception beam of the UE based on the configuration information, perform a measurement related to the at least one downlink PRS resource based on the received at least one downlink PRS, determine a measurement value, and transmit an uplink signal including the determined measurement value and a downlink PRS resource ID related to the determined measurement value through a transmission beam of the UE, and
wherein the transmission beam is determined based on a reception beam having the determined measurement value satisfying any of a number of predefined conditions among the at least one reception beam.

7. The UE according to claim 6, wherein the predefined conditions include having a minimum of propagation time (PT), time of arrival (ToA), or time of flight (ToF) measurements of the at least one downlink PRS or having a maximum of reference signal received power (RSRP) measurements of the at least one downlink PRS.

8. The UE according to claim 6,
wherein the at least one processor is further configured to receive location information about the BS or the TP, and
wherein the configuration information includes information about a cell-identifier (cell-ID) of a cell in which the BS or the TP is located.

9. The UE according to claim 8, wherein a direction range for the at least one reception beam of the UE is limited based on the location information and the cell-ID.

10. The UE according to claim 6, wherein the at least one processor is configured to transmit information about at least one of a direction of the transmission beam of the BS or the TP or an angle of the transmission beam of the BS or TP.

11. An apparatus operating in a wireless communication system, the apparatus comprising:
at least one processor; and
at least one memory operably coupled to the at least one processor and storing at least one instruction which based on being executed, causes the at least one processor to perform operations,
wherein the operations include:
receiving configuration information related to at least one downlink positioning reference signal (PRS) resource;
receiving at least one PRS through at least one reception beam of the UE based on the configuration information;
performing a measurement related to the at least one downlink PRS resource based on the received at least one downlink PRS;
determining a measurement value; and
transmitting an uplink signal including the determined measurement value and a downlink PRS resource ID related to the determined measurement value through a transmission beam of the UE based on the at least one PRS,
wherein each downlink PRS resource is transmitted in a single OFDM symbol and two or more downlink PRS resources are multiplexed in time division multiplexing over a transmission beam of a base station (BS) or a transmission point (TP), and
wherein the transmission beam of the UE is determined to be a reception beam having the determined measurement value satisfying any of a number of predefined conditions among the at least one reception beam.

12. A non-transitory processor-readable medium storing at least one instruction which causes at least one processor to perform operations,
wherein the operations include:
receiving configuration information related to at least one downlink positioning reference signal (PRS) resource;
receiving at least one downlink PRS through at least one reception beam of the UE;
performing a measurement related to the at least one downlink PRS resource based on the received at least one downlink PRS;
determining a measurement value; and
transmitting an uplink signal including the determined measurement value and a downlink PRS resource ID related to the determined measurement value through a transmission beam of the UE,
wherein each downlink PRS resource is transmitted in a single OFDM symbol and two or more downlink PRS resources are multiplexed in time division multiplexing over a transmission beam of a base station (BS) or a transmission point (TP), and
wherein the transmission beam of the UE is determined based on a reception beam satisfying any of a number of predefined conditions among the at least one reception beam.

* * * * *